United States Patent [19]

Hayashi

[11] Patent Number: 4,616,323

[45] Date of Patent: Oct. 7, 1986

[54] CONTROL DEVICE AND A METHOD FOR SENDING AND RECEIVING INFORMATION IN A VENDING MACHINE AND THE LIKE APPARATUS

[75] Inventor: Yukichi Hayashi, Sakado, Japan

[73] Assignee: Kabushiki Kaisha Nippon Coinco., Tokyo, Japan

[21] Appl. No.: 581,532

[22] Filed: Feb. 21, 1984

[30] Foreign Application Priority Data

Feb. 23, 1983 [JP] Japan .................................. 58-29129

[51] Int. Cl.[4] ........................ G06F 15/46; G07F 11/16

[52] U.S. Cl. .................................... 364/479; 194/217; 364/900

[58] Field of Search ........ 364/478, 479, 200 MS File, 364/900 MS File; 340/825.35; 194/1 N, 1 O

[56] References Cited

U.S. PATENT DOCUMENTS

| | | | |
|---|---|---|---|
| 4,225,056 | 9/1980 | Flubacker | 364/479 X |
| 4,233,660 | 11/1980 | Fagan | 364/479 X |
| 4,282,575 | 8/1981 | Hoskinson et al. | 364/479 |
| 4,354,613 | 10/1982 | Desai et al. | 364/479 X |
| 4,376,478 | 3/1983 | Sugimoto et al. | 194/1 N |
| 4,499,982 | 2/1985 | Sugimoto et al. | 194/1 N |

*Primary Examiner*—Joseph Ruggiero

*Attorney, Agent, or Firm*—Spensley, Horn, Jubas & Lubitz

[57] ABSTRACT

Sending and receiving of information between a coinmech control section performing controls relating to receiving and paying out of coins and a vendor control section performing controls relating to selection and vending of an article are made under the leadership of the vendor control section. Multiple kinds of information to be sent and received are previously classified into a plurality of modes and a mode including necessary information to be sent and received is designated on the side of the vendor control section by a mode selection code. Responsive to contents of the mode selection code, one of the coinmech control section and the vendor control section is brought into an information sending state and the other into an information receiving state whereby a group of information for this mode is sent and received.

10 Claims, 19 Drawing Figures

CONTROL DEVICE AND A METHOD FOR SENDING AND RECEIVING INFORMATION IN A VENDING MACHINE AND THE LIKE APPARATUS

A control device and a method for sending and receiving information in a vending machine and the like apparatus.

BACKGROUND OF THE INVENTION

This invention relates to a control device for a vending machine and the like apparatus operating responsive to deposition of a coin or a bill and a method for sending and receiving information in such device.

Control devices for a typical vending machine generally consist of a section which is mounted on the side of a coin mechanism (hereinafter referred to as a "coinmech control section") and a section which is mounted on the side of a vending machine proper (hereinafter referred to as a "vendor control section"). The vendor control section is constructed so as to be adapted to the purpose of the vending machine whereas the coinmech control section is constructed so as to be adapted to the coin mechanism and the construction of the vendor control section combined with the coin mechanism.

The coinmech control section generally has functions including a function of counting the amount of deposited money in response to a signal from a coin switch and judging whether vending is possible or not upon comparing the amount of deposited money with a set vend price, a function of subtracting the set vend price from the amount of deposited money when vending has been made and paying out change upon completion of the vending operation. The vendor control section has functions including a function of sending a set vend price signal to the coinmech control section when necessary, a function of controlling dispensing of a selected article when the judgement that vending is possible has been made, a function of supplying a money collection signal or a change payout signal to the coinmech control section and other special functions depending upon the use or purpose of the vending machine.

Operations in the coinmech control section and the vendor control section have a somewhat random aspect in that one control section cannot estimate the operation of the other control section timewise accurately and hence it is necessary in the prior art vending machine to construct the two control sections in such a manner that while they are performing their operations independently and sending their output signals to each other independently from each other, they keep incessant watch on states of input signals from their counterpart control section which are timewise unexpectable. For example, the time when a coin is deposited in the vending machine (i.e., when a coin deposition signal is supplied from the coinmech control section to the vendor control section) is quite unexpectable. A similar situation exists for other signals. For this reason, the signal transmission between the two control sections has previously had to be made in a parallel processing resulting in provision of an enormous number of wirings. Even if a time-division serial processing is employed, the prior art machine in which the two control sections must constantly watch the signal states of each other requires high speed in the scanning cycle with resulting difficulty in the circuit construction or the design of the scanning program.

A further problem arises in making a universal type of coin mechanism which has recently been attempted from the standpoints of productivity and economy. For making a universal type of coin mechanism, the coin mechanism must be constructed such that it will be adapted to all uses and functions and, for this purpose, necessary numbers of switches and relating circuits corresponding to such uses and functions must be provided. Special functions to be provided in the coin mechanism side for realizing the universal type of coin mechanism include (1) single vending-plural vending switching, (2) restriction on the number of successive vending, (3) successive vending timer, (4) minimum set price, (5) total sales price display, (6) vend test time price display, (7) vend test and (8) intermittent display at the time of malfunction and malfunction display. Switches and relating circuits corresponding to these functions therefore are required. Since the size of the coin mechanism is limited, there is physical and economic difficulty in mounting all of the switches and circuits relating to these special functions in the coin mechanism. For example, a common layout of ten numerical keys which are inexpensive but bulky cannot be used because of the insufficiency of space. In addition, compact but expensive switches must be individually provided such that the device is uneconomical. There is a case in which the common ten numerical keys can be used, however. In this case, a back-up circuit for the stoppage of electricity in a memory storing ten numerical key input data or a nonvolatile memory must be provided resulting in an increase in the cost. In addition, numerical keys for setting data and a back-up circuit for stoppage of electricity must be provided on the vendor control section side also and such provision of the same components in the two control sections is disadvantageous from the standpoint of the cost. Besides, there are very few types of vending machine which use all of the special functions provided on the side of the coinmech control section for making the universal type vending machine and some of these functions are found unnecessary and simply wasted depending upon the type and use of the vending machine.

There is a prior art vending machine of a type in which, for the purpose of making a universal type of vending machine, main functions of the coinmech control section, i.e., counting, comparison and other operation functions, are removed and switches, motors and solenoids only are retained. In this type of vending machine, however, substantial control and operation functions are all dependent upon the vendor control section so that switches, a change payout motor and a CREM solenoid must be connected to the vendor control section by independent wirings resulting in increase in the number of wirings between the coinmech control section and the vendor control section. Further, the vendor control section must constantly watch a number of switch output signals provided from the coin mechanism side whereby difficulty arises in the circuit design. For example, state of the coin switch output signal must constantly be watched. During paying out of change, states of output signals of a motor carrier switch and a coin confirmation switch must constantly be watched. It is a tremendous load to the vendor control section to watch states of output signals of the coin mechanism side and control necessary operations such as money amount counting in accordance with results of watching while controlling operations relating to aritcle selection and vending. In a system employing a microcomputer, a scanning program must be prepared so as not to overlook an instantaneous change in the switch output signal, which places a heavy burden on the preparation of the program and the design of a program ROM. Furthermore, the necessity for detecting an instantaneous signal change on the side of the coin mechanism tends to cause an error due to insufficient connection of a connector.

SUMMARY OF THE INVENTION

It is, therefore, an object of the present invention to improve the signal sending and receiving system between the coinmech control section and the vendor control section thereby to simplify the construction of the coinmech control section while securing universal type characteristics of the device, and further give a sufficient allowance to the circuit design and program preparation for the signal watching in the vendor control section, decrease the number of wirings between the two control sections and eliminate errors occurring in the signal transmission.

For achieving the above object, the invention is characterized in that the control device comprises first means in which a vendor control section exclusively demands that predetermined information be delivered from a coinmech control section (first control section) to a vendor control section (second control section) or, conversely, the coinmech control section receives predetermined information from the vendor control section and the coinmech control section receives this demand, and second means which, responsive to this demand, brings one of the two control sections into a state in which it can deliver out the predetermined information and the other into a state in which it can receive the information, whereby sending and receiving of the information between the two control sections are performed under the leadership of the vendor control section (the second control section). As a result, the necessity for provision of special input and output devices relating to the special functions depending upon use and type of the vending machine on the side of the coinmech control section is obviated whereby simplification of the construction is realized. Since the vendor control section has the leadership in the sending and receiving of the information, it suffices that data necessary for the special functions is set by utilizing the devices (switches, setting keys etc.) provided on the side of the vendor control section and sent to the coinmech control section. Accordingly, the input and output devices on the side of the coinmech control section (switches etc.) have only to be provided in a minimum degree. Further, according to the invention, since data (information) of the special functions can be received from the side of the vendor control section when necessary in accordance with the demand of the vendor control section, the coinmech control section can function freely in accordance with the function of the combined vendor control section whereby a universal type coinmech control section can be provided. As to factors having timewise uncertainty such as counting of deposited coins, it is possible that such factors are processed independently by the coinmech control section, results of the processing are stored as data to be sent to the vendor control section and delivered out upon demand from the vendor control section, whereby a sufficient allowance can be given to the circuit design or program preparation for signal watching in the vendor control section. Since necessary information only is transmitted in accordance with the demand of the vendor control section, the amount of information to be transmitted at a time is reduced whereby the number of signal wirings between the two control sections can be reduced, and an error occurring in the signal transmission can be eliminated because signals are transmitted with ample allowance, i.e., the error can be eliminated by comparing and collating signals of the two control sections so as to confirm that the same signal has been accurately sent and received between the two control sections, The outline of the invention is illustrated by FIG. 15. In FIG. 15, the first means is designated by reference numeral 25. The first means 25 consists of demand judgement means 25B on the side of the coinmech control section 10 and demand generation means 25A on the side of the vendor control section 11. The demand for sending and receiving of predetermined information is generated by the demand generation means 25A and this demand is judged by the information judgement means 25B. The second means is designated by reference numeral 26. The second means 26 consists of input and output processing means 26A and 26B provided in the two sections 10 and 11. The respective processing means 26A and 26B perform sending or receiving of information in accordance with the demand generated or judged by the means 25A or 25B. In the embodiment to be described below, the demand for sending or receiving of information is designated by the term "mode select". The demand generation means 25A corresponds to MSCi processing shown in FIGS. 11(*a*) and 11(*b*), the demand judgement means 25B to MSC judgement processing shown in FIG. 5 and the input and output processing means 26A and 26B to I/O processing shown in FIGS. 7(*a*) and 7(*b*) and FIGS. 12(*a*) and 12(*b*).

BRIEF DESCRIPTION OF THE DRAWINGS

In the accompanying drawings.

DESCRIPTION OF A PREFERRED EMBODIMENT

An embodiment of the present invention will now be described with reference to accompanying drawings.

Hardware Structure

Figure 1:
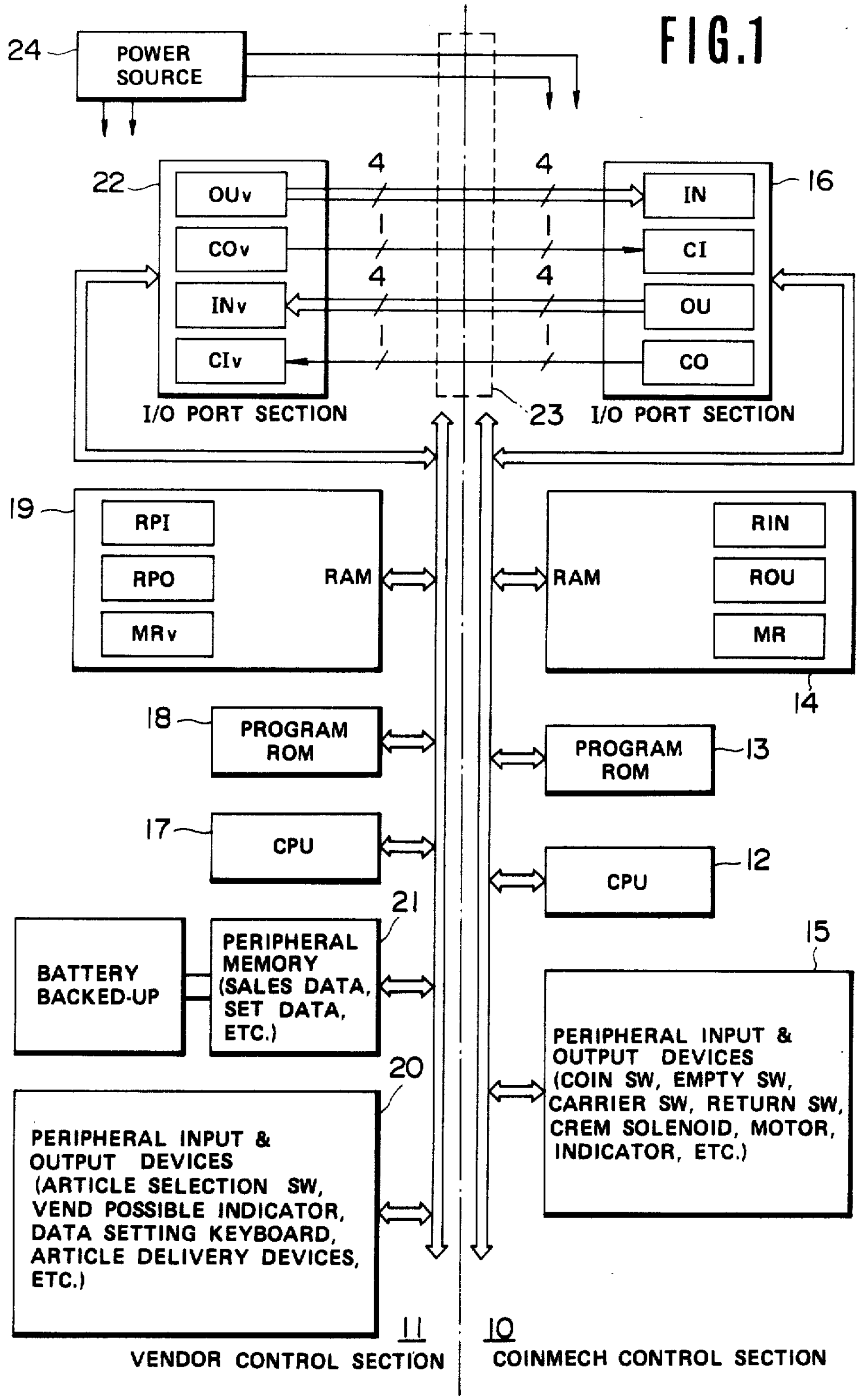
FIG. 1 is an electrical block diagram showing an embodiment of the control device according to the invention.

Referring first to FIG. 1, a coinmech control section 10 is mounted in a coin mechanism (abbreviated sometimes as "coinmech") and has control functions such as operation and comparison as to functions of the coin mechanism, i.e., functions relating to receiving and paying out of coins (the term "coin" used herein is not limited to coins proper but should be interpreted to include bills also). For example, the coinmech control section 10 can be constructed of a microcomputer system and includes a central processing unit (hereinafter referred to as "CPU") 12, a program ROM (ROM is the abbreviation for read-only memory) 13, a random access memory (hereinafter referred to as "RAM") 14, a peripheral input and output device 15 and an input and output port section (hereinafter referred to as "I/O port section") 16 for a vendor control section 11. The peripheral input and output device 15 is a known device and includes switches, a motor, a solenoid, a display unit etc. which are indispensable for the coin mechanism. For example, the device 15 includes coin switches for respective denominations, empty switches for respective denominations, a motor for paying out coins, a carrier switch for this motor, a coin return switch, a CREM (coin reject electromagnetic device and a solenoid).

The vendor control section unit 11 controls an article selection operation, an article dispensing operation and other various special functions corresponding to uses and types of vending machines. For example, the vendor control section 11 may also be constructed of a microcomputer system and includes a CPU 17, a program ROM 18, a RAM 19, a peripheral input and output device 20, a peripheral memory 21, an I/O port section 22 for the coinmech control section 10. The peripheral input and output device 20 comprises ten numerical keys or switches for setting various data such as an article selection switch group, a vend enable indicator, a relay relating to dispensing of articles, a solenoid, a motor, and a carrier switch, and also comprises other switches and indicator lamps. The peripheral memory 21 consists of a non-volatile or battery backed-up memory capable of both writing and reading and stores sales data, set vend price and other various set data.

Input and output wirings for the I/O port section 16 are connected to those for the I/O port section 22 through a connector 23. For reducing the size of the coin mechanism, a power circuit 24 is provided on the side of the vendor control section 11 and power is supplied from the side of the vendor control section 11 to the side of the coinmech control section 10 through the connector 23.

In the I/O port section 16 on the coin mechanism side, the data input port is denoted by IN, the data output port by OU, the control signal input port by CI and the control signal output port by CO. In the I/O port section 22 on the vendor side, the data input port is denoted by INv, the data output port by OUv, the control signal input port by CIv and the control signal output port by COv. Through the connector 23, the IN port is connected to the OUv port, the OU port to the INv port, the CI port to the COv port and the CO port to the CIv port, respectively. The data consists of 4 bits and the control signal 1 bit. Input port data registers RIN and RPI temporarily store data which has been loaded through the input port. Output port data registers ROU and RPO temporarily store data to be delivered out of the output port. Data pool memories MR and MRv temporarily store (pool) a data set which has been loaded through the input port and the registers RIN and RPI or a data set to be delivered out of the output port and the registers ROU and RPO. A predetermined area in the RAM's 14 and 19 is utilized for these registers RIN-RPO and memories MR and MRv.

Characteristic of the present invention is that the coinmech control section 10 has its own CPU 12 and thereby is capable of performing control operations (i.e., switch input scanning and output signal supply operations) for the peripheral input and output device 15 independently of and not synchronously with the operation of the vendor control section 11 and that the vendor control section 11 takes the initiative in sending and receiving of a signal between the coinmech control section 10 and the vendor control section 11, i.e., the coinmech control section 10 sends out or receives data in compliance with the order of the vendor control section 11.

Signals sent and received between the coinmech control section 10 and the vendor control section 11 consist, for example, of 45 kinds shown below (though not limited to this). These 45 kinds of signals are classified into the following mode blocks (groups) in accordance with the signal sending and receiving mode and the signals are sent and received by the mode block. For example, the modes consist of the following ten kinds and signals of a common nature are sent and received as a group in each mode. The vendor control section 11 exclusively designates in which mode a specific signal is to be sent and received. The term "input mode" or "output mode" indicates a mode in which a signal is applied or a mode in which a signal is delivered out as viewed from the side of the coinmech control section 10.

Modes And Signals

1. Coin Control Data Mode (Input Mode)

This is a mode in which the coinmech control section 10 inputs an order signal from the vendor control section 11 and effects processings in compliance with this order. There are the following kinds in the order signal provided by the vendor control section 11 and processing operations of the coinmech control section 10 are as follows:

(1) Article Delivery Period Signal (SES)

This signal is generated when an article delivery operation has been started in the vendor control section 11. Upon application of this signal, CREM (coin reject electromagnetic device) is turned OFF and a PSS signal to be described later is produced.

(2) Vend Price Collection Order Signal (PSO)

This is a signal indicating completion of vending. Upon application of this signal, a money collection processing i.e., a processing for subtracting a vend price from an amount of a deposited coin or coins, is performed. The PSS signal is stopped after this money collection operation has been completed.

(3) Money Return Start Order Signal (APO)

This is a signal ordering return of the deposited money or change money. In a case where this signal has been given with the SES signal, a change payout operation is effected upon the lapse of a timer which starts when the PSS signal is produced. When the SES signal is absent, i.e., when this signal APO only has been applied, the deposited money return operation is performed in the same manner as in a manual money return operation.

(4) Deposited Money Inhibition Order Signal (IPO)

The CREM is turned OFF when this signal has been applied and it is turned ON when this signal has not been applied.

(5) Change Payout Stop Order Signal (PBSO)

A change payout motor is stopped when this signal has been applied and it is started when this signal has not been applied.

(6) Display Stop Order Signal (DSO)

Displaying on a money amount indicator is stopped when this signal has been applied and the displaying is made possible when the signal has not been applied.

(7) Coinmech Clear Signal (MCL)

This signal is provided from the side of the vendor control section 11 when power is applied. Upon receipt of this signal, the coinmech control section 10 performs an automatic clear processing for the time when power is applied and produces an STS signal to be described later from the time when this signal has ceased.

(8) Exchange Signal (CASE)

If this signal is given in a state in which money has been received, the coinmech control section 10 subtracts a money amount equivalent to one 1000-yen coin from contents of a 1000-yen coin deposited amount counter (register) and adds 1000-yen to contents of a 100-yen coin deposited amount counter (register).

(9) 10-Yen Inventory Signal (INV10)

(10) 50-Yen Inventory Signal (INV50)

(11) 100-Yen Inventory Signal (INV100)

(12) 500-Yen Inventory Signal (INV500)

(13) Subtube Inventory Signal (INVSUB)

When these signals have been provided, the coinmech control section 10 performs an inventory operation (i.e., operation for paying out a coin in a storage tube) concerning the corresponding denomination. When these signal have ceased, the coinmech control section 10 stops the inventory operation. During the inventory operation, an inventory payout period signal (IVS) is produced. The subtube inventory signal (INVSUB) is a signal commanding payout of a coin in the subtube.

II. Vend Price Data Mode (Input Mode)

This is a mode in which the coinmech control 10 receives vend price data from the vendor control section 11. This data is compared with the amount of deposited money to conduct judgement as to whether vending is possible or not. Accordingly, there is only one kind of signal in this mode which is as follows:

(14) Vend Price Data Signal (PSD)

This signal is produced by the vendor control section 11 during a period in which an ACS signal to be described later is produced by the coinmech control section 10. Plural vend price data corresponding to respective articles are provided in a predetermined order.

III. Settlement Amount Data Mode (Input Mode)

This is a mode in which the coinmech control section 10 receives settlement amount data from the vendor control section 11 to judge whether or not the amount of deposited money is below the amount of settlement. The amount of settlement means a continuous vending stop price. If the amount of deposited money is larger than this amount of settlement, continuous vending is made possible whereas if the amount of deposited amount is equal to or smaller than the amount of settlement, the continuous vending is made impossible. A signal belonging to this mode is only the following one kind.

(15) Settlement Amount Data Signal (ECD)

This signal is produced by the vendor control section 11 during a period in which an STS signal to be described later is provided by the coinmech control section 10 or when a PSS signal to be described is produced during the period in which the SES signal is applied.

IV. Count-Up Amount By Coin Data Mode (Input Mode)

This is a mode in which the coinmech control section 10 receives coin (including a bill) amount data for each money amount from the vendor control section 11 and this amount data is added to a deposited money amount by denomination counter (register) in the coinmech control section 10. When, for example, a discount sale is conducted, discount amount data is provided in this mode from the vendor control section 11 to the coinmech control section 10. For another example, count amount by denomination data which was stored in the memory 21 in the vendor control section 11 during stoppage of electric current by a count amount by coin data mode to be described later is brought back to the coinmech control section 10 for presetting it in the counter. There is the following one signal belonging to this mode:

(16) Count-Up Amount By Coin Data Signal (CACUD)

This represents count money amount data by denomination as was described above.

V. Information Data Mode (Input Mode)

This is a mode in which the coinmech control section 10 receives information data from the vendor control section 11. This data is displayed by a money amount indicator provided on the coinmech side. There is the following one kind of signal belonging to this mode:

(17) Information Data Signal (INFD)

When desired information such as temperature and time is to be provided during production of an STS signal to be described later, data corresponding to the contents of information is provided by the vendor control section 11.

VI. Vend Control Data Mode (Output Mode)

This is a mode in which various states of the coin mechanism side are supplied from the coinmech control section 10 to the vendor control section 11. There are the following 14 kinds of signals belonging to this mode. Conditions of generation of these signals are described below.

(18) Vend Possible Judgement Signal (OKSP)

This signal is produced when a sum of amounts of deposited money in the deposited amount counter (register) has been compared with the vend price data (PSD) and, as a result, the judgement that vending is possible has been made.

(19) Vend Impossible Judgement First Signal (KNSP)

This signal is produced when, as a result of the above described comparison, the sum of the amounts of deposited money in the counter is below the vend price data (PSD).

(20) Vend Impossible Judgement Second Signal (KPSP)

This signal is produced when, as a result of the above comparison, the sum of the amounts of deposited money in the counter is equal to or larger than the vend price data (PSD) but the OKSP signal has not been produced.

(21) Standby State Period Signal (STS)

This signal is produced in a period before deposition of a coin in a normal state.

(22) Price Check Possible Period Signal (ACS)

This signal is produced after deposition of a coin and stopped when PSS signal and MPO signal to be described later have been produced.

(23) Vend Price Collection Possible Period Signal (PSS)

This signal is produced when the above described SEE signal has been produced and money collection (i.e., subtraction of the vend price from the sum of the amounts of deposited money) has been made possible. The production of this signal is stopped when the SES signal has ceased or the money collection processing has been completed.

(24) Change Payout Period Signal (PBS)

This signal is produced during the change payout operation and the money return operation and stopped upon completion of these operations.

(25) Continuous Vending Possible Period Signal (CSS)

This signal is produced when the sum of the deposited amount counter is other than 0 in a normal state and stopped when the contents of the counter have been reduced to 0.

(26) Inventory Payout Period Signal (IVS)

This signal is produced while the inventory operation (i.e., operation for paying out a stored coin in the coin mechanism) is being normally performed.

(27) Settlement Amount Range Signal (ECE)

This signal is produced when the sum of the amounts of deposited money in the deposited amount counter is below the above described settlement amount data (ECD).

(28) 10-Yen Change Shortage Signal (EP1)

This signal is produced when the judgement that 10-yen coins stored for change (or money to be returned) are short has been made and stopped when the judgement that the 10-yen coins are not short has been made.

(29) 100-Yen Change Shortage Signal (EP2)

This signal is produced when the judgement that 100-yen coins stored for change (or money to be returned) are short has been made and stopped when the judgement that the 100-yen coins are not short has been made.

(30) Manual Money Return Enable Signal (MP0)

This signal is produced when the return switch has been operated and stopped upon completion of the money return operation.

VII. Trouble Monitor Data Mode (Output Mode)

This is a mode in which data representing a trouble state in the coin mechanism is supplied from the coin-mech control section 10 to the vendor control section 11. There are the following 13 kinds of signals belonging to this mode. Conditions of generation of these signals are described below.

(31) 10-Yen Coin Switch NG Signal (CNG10)

This signal is produced when a 10-yen coin switch has continued to supply a coin detection signal over a predetermined period of time (e.g. 300 ms).

(32) 50-Yen Coin Switch NG signal (CNG50)

This signal is produced when a 50-yen coin switch has continued to supply a coin detection signal in the same manner as described above.

(33) 100-Yen Coin Switch NG Signal (CNG100)

This signal is produced when a 100-yen coin switch has continued to supply a coin detection signal in the same manner as described above.

(34) 500-Yen Coin Switch NG Signal (CNG500)

This signal is produced when a 500-yen coin switch has continued to supply a coin detection signal in the same manner as described above.

(35) 1000-Yen True Bill NG Signal (BSHNG)

This signal is produced when a 1000-yen true bill signal which is produced when a deposited bill has been detected to be a true bill has been continuously supplied over a predetermined period of time in the same manner as described above.

(36) Bill Return Confirmation NG Signal (BPBNG)

This signal is produced when a confirmation signal confirming that a 1000-yen bill has been returned has been continuously supplied over a predetermined period of time in the same manner as described above.

(37) Change Payout NG Signal (MOST)

This signal is produced when the judgement that there is malfunction in the payout of change has been made.

(38) Pulse Switch NG Signal (PSNG)

This signal is produced when a pulse switch signal has been continuously applied over a predetermined period of time (e.g. 300 ms).

(39) Coinmech Abnormal Signal (TRBC)

This signal is produced when there is malfunctioning in the coin mechanism.

(40) Bill Evaluation Abnormal Signal (TRBB)

This signal is produced when there is malfunctioning in a bill discrimination device attached to the coin mechanism.

(41) Return Switch NG Signal (MNNG)

This signal is produced when an output signal of the return switch has been continuously produced over a predetermined period of time (e.g. 300 ms).

(42) Safety Switch NG Signal (SFNG)

This signal is produced when an output signal of a safety switch provided in the coin mechanism has been continuously produced over a predetermined period of time.

(43) Coin Locking Signal (CILK)

This signal is produced when locking of a coin in the coin passage of the coin mechanism has been detected. For example, the coin mechanism comprises a coin selection device and coin switches for respective denominations actuated by coins of the respective denominations which have been selected by the coin selection device. When a coin passes through the coin selection device, a predetermined timer is started and the coin locking signal is produced upon lapse of the operation time of this timer. The generation of this signal is stopped by a coin detection signal of this coin switch. Since the coin detection signal is normally obtained during the operation time of the timer, the coin locking signal is not produced at all. When locking of a coin has occurred, the timer operation time elapses while the coin detection signal has not been obtained so that the coin locking signal is produced.

VIII. Collected Coin Number By Denomination Data Mode (Output Mode)

This is a mode in which, when the number of collected coins for each denomination (i.e., the number of coins for each denomination which have been collected for the vend price) is calculated by performing, in the coinmech control section 10, the following calculation for the deposited coins and the paid out coins (i.e., change) in one vending operation, data representing the number of collected coins for each denomination is provided to the vendor control section 11. The basis of the calculation is "amount of deposited coins—amount of paid out coins (change) is amount of collected money." Taking both the denomination of the deposited coin and that of the paid out coin into account, the denomination of the collected coin is judged, for example, in the following manner:

EXAMPLE 1

When one 100-yen coin and one 50-yen coin have been deposited to purchase an article of 120 yen and three 10-yen coins have been paid out for change, the collected coin number data that "increase in the 100-yen coin by one, increase in the 50-yen coin by one, decrease in the 10-yen coin by three" is provided.

EXAMPLE 2

When three 50-yen coins have been deposited to purchase an article of 120 yen and three 10-yen coins have been paid out, collected coin number data that "no increase or decrease in the 100-yen coin, increase in the 50-yen coin by three, decrease in the 10-yen coin by three" is provided.

The vendor control section 11 utilizes this collected coin number by denomination data to perform control of the number of coins stored in the coin mechanism. There is the following one kind of signal belonging to this mode.

(44) Collected Coin Number By Denomination Data (CASD)

As described above, this is data representing the number of collected coins by denomination.

IX. Count Amount By Coin Data Mode (Output Mode)

This is a mode in which money amount by denomination data held in the deposited money amount by denomination counter in the coinmech control section 10 is provided to the vendor control section 11. This mode is used when, for example, deposited money amount counted by coin data immediately before stoppage of electric current is stored for shelter in the battery backed-up memory 21 in the vendor control section 11. For example, assuming that voltage used in the vendor control section 11 is 5 V and that in the coinmech control section 10 is 24 V, the power voltage is arranged to fall gradually from 24 V with a predetermined time constant and the mode is changed to the above described mode when the power voltage has fallen to about 18 V thereby causing the money amount data to be stored for shelter in the memory 21.

This mode can also be used, for example, for sending to the vendor control section 11 deposited amount data utilized in the vend possible judgement in the system wherein the vend possible judgement is made on the vendor control section side. Accordingly, this mode can be used, without changing the construction of the coinmech control section 10, either in the system wherein the vend possible judgement is made on the coin mechanism side or in the system wherein the vend possible judgement is made on the vendor side depending upon the specific construction of the vendor control section 11.

There is the following one kind of signal belonging to this mode.

(45) Count Amount By Coin Data (CACD)

This is data, as described, representing money amount counted by denomination.

X. External Device Control Data Mode

This is a mode used when total sales data in the memory 21 or other data is printed out by connecting an external printer or other external device to the I/O port section 22 in the vendor control section 11. In this mode, the coinmech control section 10 substantially ignores input data supplied from the vendor control section 11.

Data Sending Format

As was described previously, in transmitting a signal between the coinmech control section 10 and the vendor control section 11, the vendor control section 11 first supplies the coinmech control section 10 with a mode select code which is a signal designating a specific mode. If this mode is an input mode (as viewed from the side of the coinmech control section 10), the states of the above described various signals belonging to this mode are delivered successively in a predetermined format from the vendor control section 11 to the coinmech control section 10. If the designated mode is an output mode (as viewed from the coin mechanism side), the states of the various signals belonging to this mode are delivered in a predetermined format from the coinmech control section 10 to the vendor control section 11.

Data transmitted through the data input and output ports IN, OU, IVv and OUv is 4-bit parallel data in this embodiment and the mode select code is expressed in the form of 4-bit parallel data using all of these 4 bits, each of the signals being assigned to a suitable bit and timing in the transmission. Signals belonging to one mode are successively delivered out through a 4-bit data line at timings of a predetermined number and in a predetermined order.

Examples of the contents of respective mode select codes (hereinafter represented by MSC) and the order of delivery of the signals of the respective modes are shown in tables below. In the tables, the 45 kinds of signals described above are expressed by the symbols described in parenthesis after the name of the signal. The logical value of a bit signal between integrated circuits is expressed such that an active level (i.e., a state in which the signal is present) is represented by a low level, i.e., "0" and a non-active level (i.e., a state in which the signal is not present) by a high level, i.e., "1". Accordingly, a state in which all bits are "1" ("1111") represents absence of the signal. In the tables below, the reference character "1" represents a blank timing (or blank bit) in the delivery of data. Although this blank timing (or blank bit) is not utilized in the present embodiment, the blank timing is available for use for delivery of signal if it becomes necessary. In other words, an arrangement is made in the design such that there is an ample scope for addition of a special function (i.e., delivery of signal corresponding to such function). In each mode, the signal with all bits "0" ("0000") which is produced at the end of a series of signal delivery timings is an end code (ENDC). When this end code has been produced, it signifies that delivery of a series of signals concerning the particular mode has been completed. In the tables, the numerals 0, 1, 2 and 3 in the column of bits represent the numbers of the 4-bit data line in which 0 represents LSB and 3 MSB. It is assumed that the logical value of the mode select code (MSC) is expressed in the order starting from LSB. MSC2–MSC13 represent code values of the respective mode select codes MSC.

TABLE 1

| Coin control data mode (input mode) MSC being "0111" (MSC2) | | | | | | | |
|---|---|---|---|---|---|---|---|
| | order | | | | | | |
| bit | 1 | 2 | 3 | 4 | 5 | 6 | end |
| 0 | SES | PBSO | INV10 | INVSUB | 1 | 1 | 0 |
| 1 | PSO | DSO | INV50 | 1 | 1 | 1 | 0 |
| 2 | APO | MCL | INV100 | 1 | 1 | 1 | 0 |
| 3 | IPO | CASE | INV500 | 1 | 1 | 1 | 0 |

TABLE 2

| Vend price data mode (input mode) MSC being "1011" (MSC3) | | | | | | | |
|---|---|---|---|---|---|---|---|
| | order | | | | | | |
| | 1 | 2 | 3 | 4 | 5 | 6 | end |
| | unit | | | | | | |
| bit | 10 | 100 | 1000 | | | | |
| 0 | x | x | x | 1 | 1 | 1 | 0 |
| 1 | x | x | x | 1 | 1 | 1 | 0 |
| 2 | x | x | x | 1 | 1 | 1 | 0 |
| 3 | x | x | x | 1 | 1 | 1 | 0 |

Figure 10:
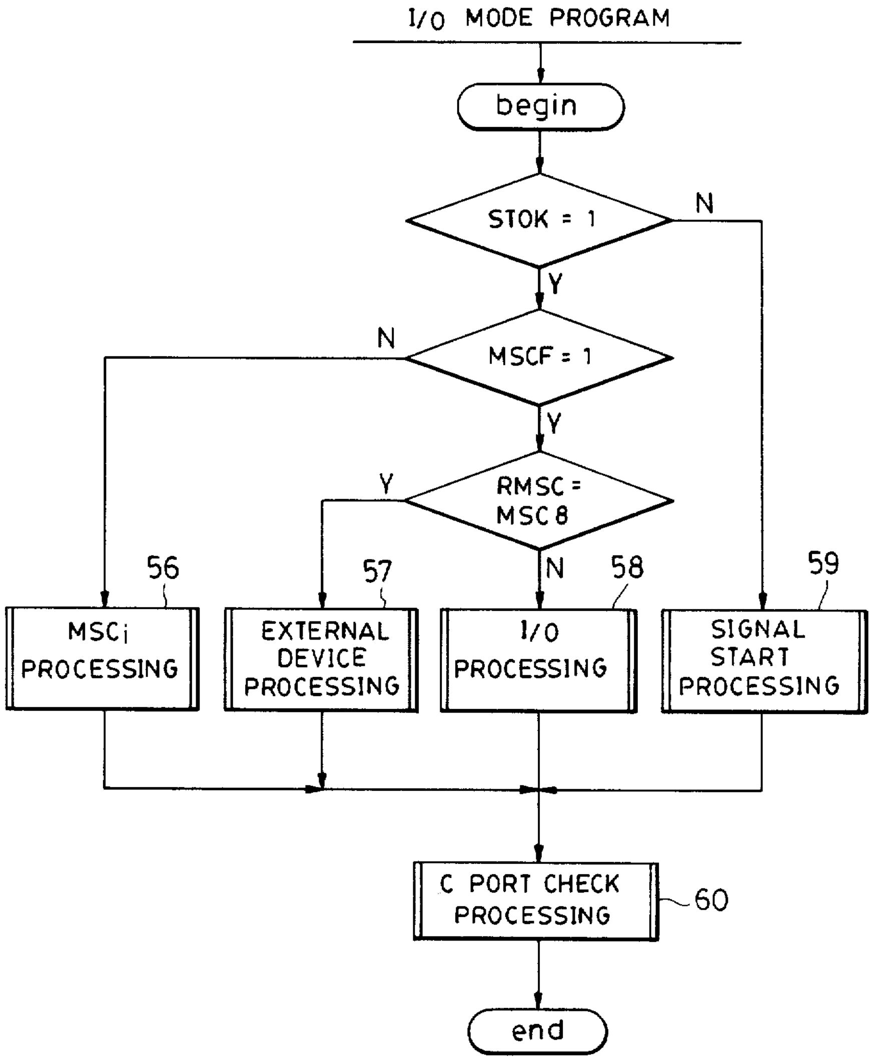
FIG. 10 is a flow chart showing an outline of an example of an I/O port mode program executed when necessary for setting necessary signal sending and receiving mode states in various steps in the program of FIG. 3 and checking signal states in the input and output port sections.

The figures 10, 100 and 1000 in the row of the unit represent digits in decimal notation of the vend price data. The symbol x indicates that any desired numerical value in the respective digits in decimal notation is expressed by a 4-bit cold (e.g. a BCD code) (the case is the same with the money amount data to be described later). Thus, x represents a desired one of "0" or "1".

TABLE 3

| Settlement amount data mode (input mode) MSC being "0011" (MSC4) |
|---|
| (Since the data delivery format is the same as Table 2, this table is omitted.) |

TABLE 4

| Count-up amount by coin data mode (input mode) MSC being "1101" (MSC5) | | | | | | | | | | | | | |
|---|---|---|---|---|---|---|---|---|---|---|---|---|---|
| | denomination | | | | | | | | | | | | |
| | 10-yen | | 50-yen | | 100-yen | | 500-yen | | 1000-yen | | 1,000-yen | | |
| | order | | | | | | | | | | | | |
| | 1 | 2 | 3 | 4 | 5 | 6 | 7 | 8 | 9 | 10 | 11 | 12 | end |
| | unit | | | | | | | | | | | | |
| bit | 1 | 10 | 1 | 10 | 1 | 10 | 1 | 10 | 1 | 10 | 1 | 10 | |
| 0 | x | x | x | x | x | x | x | x | x | x | x | x | 0 |
| 1 | x | x | x | x | x | x | x | x | x | x | x | x | 0 |
| 2 | x | x | x | x | x | x | x | x | x | x | x | x | 0 |
| 3 | x | x | x | x | x | x | x | x | x | x | x | x | 0 |

The row of denomination shows denominations of the respective coins used, e.g., six denominations ranging from a 10-yen coin up to a 10,000-yen bill. The numerals "1" and "10" in the row of unit respectively represent the digit of 1 and the digit of 10 in a value of effective digits in decimal notation in a count-up amount for each denomination. If, for example, three 500-yen coins have been deposited, the count-up amount is 1500 yen and the value of effective digits is "15". Accordingly, the digit of 1 is "5" and the digit of 10 is "1".

TABLE 5

| Information data mode (input mode) MSC being "0101" (MSC6) | | | | | | | |
|---|---|---|---|---|---|---|---|
| | order | | | | | | |
| | 1 | 2 | 3 | 4 | 5 | 6 | end |
| | unit | | | | | | |
| bit | 10 | 100 | 1000 | | | — | |
| 0 | x | x | x | 1 | 1 | x | 0 |
| 1 | x | x | x | 1 | 1 | 1 | 0 |
| 2 | x | x | x | 1 | 1 | 1 | 0 |
| 3 | x | x | x | 1 | 1 | 1 | 0 |

The row of the unit indicates the order of digits in decimal notation in the money amount indicator on the coin mechanism side. The information data includes not only figures but alphabet letters which can be indicated in 7-segment LED. An example of figures and letters (objects to be indicated) and truth values of 4-bit information data codified in correspondence to these objects to be indicated are shown in the following Table 5-1.

TABLE 5-1

| Truth table of the information data | | | | | | | | | | | | | | | | |
|---|---|---|---|---|---|---|---|---|---|---|---|---|---|---|---|---|
| | object | | | | | | | | | | | | | | | |
| bit | 0 | 1 | 2 | 3 | 4 | 5 | 6 | 7 | 8 | 9 | H | blank | C | P | E | F |
| 0 | 1 | 0 | 1 | 0 | 1 | 0 | 1 | 0 | 1 | 0 | 1 | 0 | 1 | 0 | 1 | 0 |
| 1 | 1 | 1 | 0 | 0 | 1 | 1 | 0 | 0 | 1 | 1 | 0 | 0 | 1 | 1 | 0 | 0 |
| 2 | 1 | 1 | 1 | 1 | 0 | 0 | 0 | 0 | 1 | 1 | 1 | 1 | 0 | 0 | 0 | 0 |
| 3 | 1 | 1 | 1 | 1 | 1 | 1 | 1 | 1 | 0 | 0 | 0 | 0 | 0 | 0 | 0 | 0 |

The "blank" in the row of object in table 5-1 means that the digit to which this data has been given is extinguished. In the general manner of indicating the numerical value, if, for example, data indicating "1" is given to the order of 100, "0" is automatically indicated in the lower two digits whereby the indication of "100" is obtained. If the "blank" code is used for these two lower digits, the "0" indication in the two lower digits can be extinguished. This "blank" code does not indicate general extinguishment of the indication digit but indicates clearing of a register corresponding to the indication digit. In Table 5, "x" for the bit "0" of the order 6 becomes "1" when the indication digit of the order of 1 has been extinguished and becomes "0" when the indication digit has been lighted.

TABLE 6

Vend control data mode (output mode) MSC being "0110" (MSC10)

| bit | order 1 | 2 | 3 | 4 | 5 | 6 | end |
|---|---|---|---|---|---|---|---|
| 0 | STS | OKSP | PBS | EP1 | 1 | 1 | 0 |
| 1 | ACS | KNSP | IVS | EP2 | 1 | 1 | 0 |
| 2 | PSS | KPSP | MPO | 1 | 1 | 1 | 0 |
| 3 | CSS | ECE | 1 | 1 | 1 | 1 | 0 |

TABLE 7

Trouble monitor data mode (output mode) MSC being "1010" (MSC11)

| bit | order 1 | 2 | 3 | 4 | 5 | 6 | end |
|---|---|---|---|---|---|---|---|
| 0 | CNG10 | BSHNG | MOST | CILK | 1 | 1 | 0 |
| 1 | CNG50 | BPBNG | PSNG | 1 | 1 | 1 | 0 |
| 2 | CNG100 | TRBC | MNNG | 1 | 1 | 1 | 0 |
| 3 | CNG500 | TRBB | SFNG | 1 | 1 | 1 | 0 |

TABLE 8

Collected coin number by denomination data mode (output mode) MSC being "0010" (MSC12)

| | denomination: 10-yen | | | 50-yen | | | 100-yen | | | 500-yen | | | 1000-yen | | | 10,000-yen | | | |
|---|---|---|---|---|---|---|---|---|---|---|---|---|---|---|---|---|---|---|---|
| order | 1 | 2 | 3 | 4 | 5 | 6 | 7 | 8 | 9 | 10 | 11 | 12 | 13 | 14 | 15 | 16 | 17 | 18 | end |
| bit / unit | | 1 | 10 | | 1 | 10 | | 1 | 10 | | 1 | 10 | | 1 | 10 | | 1 | 10 | |
| 0 | 1 | x | x | 1 | x | x | 1 | x | x | 1 | x | x | 1 | x | x | 1 | x | x | 0 |
| 1 | 1 | x | x | 1 | x | x | 1 | x | x | 1 | x | x | 1 | x | x | 1 | x | x | 0 |
| 2 | 1 | x | x | 1 | x | x | 1 | x | x | 1 | x | x | 1 | x | x | 1 | x | x | 0 |
| 3 | 1 | x | x | 1 | x | x | 1 | x | x | 1 | x | x | 1 | x | x | 1 | x | x | 0 |

"1" and "10" in the unit represent, as in the previous Table 5, the orders of 1 and 10 in the decimal number indicating the number of the collected coins. The number of the collected coins is indicated by using a decimal number of two digits and the negative number is indicated by a complement.

TABLE 9

| Count amount by coin data mode (output data) MSC being "1100" (MSC13) |
|---|
| (Since the data delivery format is the same as Table 4, this table is omitted.) |

MSC of the external device control data mode is "0001" and its symbol is MSC8.

In the rows of the order in the above tables, the order of delivery of the 4-bit parallel data in the respective modes is shown. The order of delivery of the 4-bit parallel data is so arranged that a next delivery is made when the receipt by the receiving side of the data of the same contents as the sending side has been confirmed. More specifically, the receiving side sends back the same data as the received 4-bit data to the sending side which in turn collates the sent back data with the sent data and proceeds to a next data delivery order when it has been confirmed that the two data coincide with each other. This collation is performed also in sending and receiving of the mode select code MSC, whereby the delivery of the data shown in the above tables corresponding to the respective modes is started when the mode has been confirmed on the side of the coin mechanism control section 10.

Each 4-bit data which has been delivered out in each delivery order in a particular mode is stored one by one in a data pool memory MR or MRv provided in the receiving side and, when the receipt of the end code (ENDC) has finally been confirmed, the contents of the memory MR or MRv are transferred by block to predetermined locations in the RAM's 14 and 19. The CPU's 12 and 17 perform predetermined processings in accordance with the signals which have been transferred from the I/O port sections 16 and 22 and stored at the predetermined locations in the RAM's 14 and 19. Details of the data sending and receiving processings between the I/O port sections will now be described.

Outline of Data Sending and Receiving Processings

In the coinmech control section 10, a coinmech I/O port check program (I/OCHECK) as shown in FIGS. 4–9 is executed for data sending and receiving control through the I/O port section 16. This I/OCHECK program is executed, when required, as a subroutine in various steps in the main processing program in the coinmech control section 10. More specifically, the I/OCHECK program is suitably carried out in the course of execution by the coinmech control section of its proper processing with the peripheral input and output device 15 and sending and receiving of data between the coinmech control section 10 and the vendor control section 11 is performed during this program.

In the vendor control section 11, a vendor-I/O port mode program (I/OMODE) as shown in FIG. 10 is executed for data sending and receiving control through the I/O port section 22. This I/OMODE program is executed when the vendor control section 11 demands the coinmech control section 10 to input or output a signal of a desired mode. Timing and type of the mode which the vendor control section 11 demands (select) is determined by the main processing program on the side of the vendor control section 11 and this may be designed as desired depending upon the use, function and type of the vending machine.

Figure 2:
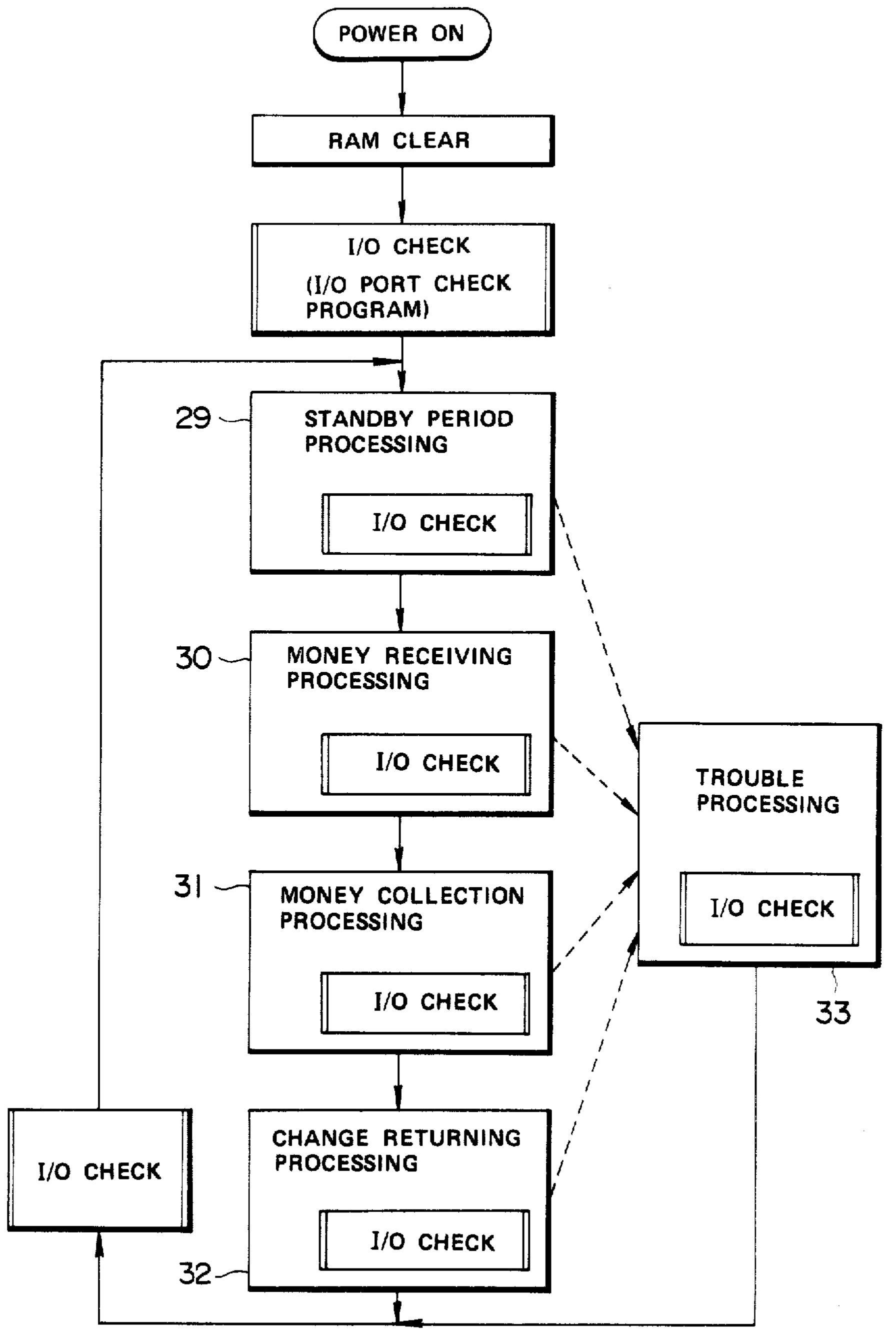
FIG. 2 is a flow chart showing an outline of an example of a program executed in a coinmech control section shown in FIG. 1.

FIG. 2 shows an example of the main processing program executed in the coinmech control section 10 in a rough outline. Details of the program are not essential for the present invention and most of it may relate to execution of processings in the coinmech control section 10. In a standby period processing 29, various processings to be executed in a standby state prior to deposition of a coin are carried out. In a money receiving processing 30, various processings to be executed upon deposition of the coin (e.g., the counting of deposited money amount, the vend possible judgement and other processings) are carried out. In a money collection processing 31, various processings to be executed upon start of the vending operation (the article delivery operation) on the side of the vendor control section 11 (e.g., subtraction of the vend price from the amount of the deposited money and other processings) are carried out. In a change return processing 32, various processings to be executed when change or deposited money should be paid out are carried out. In a trouble processing 33, processings relating to trouble detection and trouble indication are carried out. The trouble processing 33 is incorporated in the course of the above described processings 29–32 and is executed as required. The I/OCHECK program (FIG. 4) is incorporated in the course of the processings 29–33 and is executed as required and also at the start and repeating of the main routine. Since details of the respective processings 29–33 can be readily understood from the description of the 45 kinds of input and output signals SES–CACD (i.e., in the signals of the input mode, the description of the processings in the coinmech control section 10 and in the signals of the output mode, the description of the conditions of delivery of such signals), description of such details will be omitted. For example, the money collection processing 31 is started when the above described signal PSO has been given and the change return processing 32 is started when the signal APO has been given.

In the coinmech control section 10, states of the signals of the output mode are established in the course of the processings 29–33 and these status are written at each step in a predetermined area of the RAM 14. In executing the I/OCHECK program, the signals of the mode required by the vendor control section 11 (i.e., the output mode) are read in a package from the predetermined area of the RAM 14 and loaded in the data pool memory MR from which the signals are delivered out through the I/O port section 16 in a predetermined format. Accordingly, operations such as scanning for establishing the states of these signals of the output mode can be performed independently and sufficiently without being affected by the vendor control section 11 at all. Similarly, processings (such as scanning) for inquiring states of the signals of the output mode from the vendor control section 11 can be performed independently and sufficiently without being affected by the minimum scanning period required for the coin mechanism side.

Figure 3:
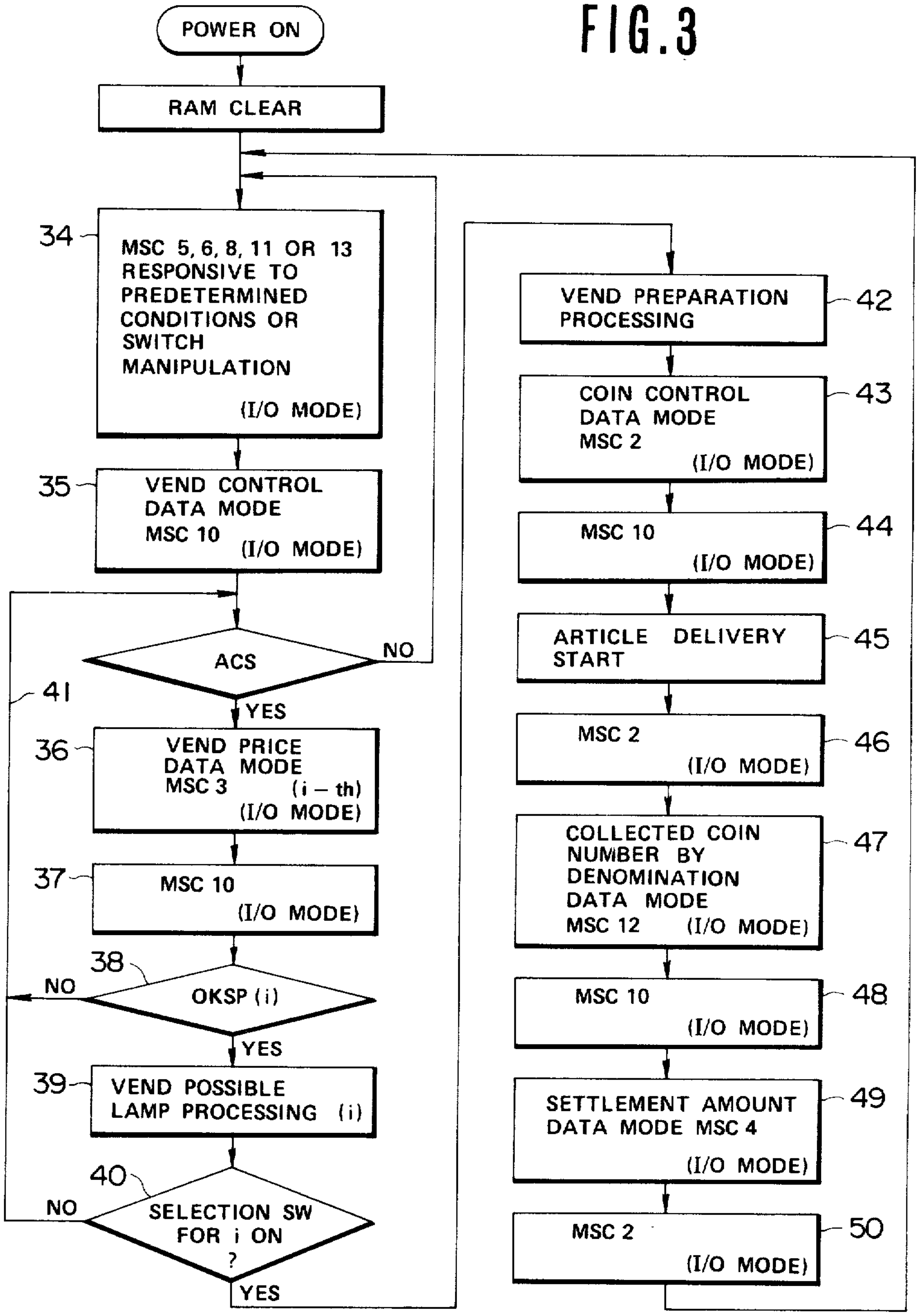
FIG. 3 is a flow chart showing an outline of a program executed in a vendor control section shown in FIG. 1.

FIG. 3 shows an example of the processing program in the vendor control section 11 in a rough outline, mainly dealing with the mode select processing. As was previously described, the timing and type of the mode to be required (selected) can be freely designed, the program of FIG. 3 is shown only by way of example for the convenience of explanation. Further, as was described in explaining the 45 kinds of input and output signals SES–CACD, there are some modes that can be suitably selected in accordance with the states of the output signals from the coinmech control section 10 and these modes are omitted in FIG. 3 for the convenience of explanation.

In the standby period, processings including those of the count-up amount by coin data mode (MSC5), information data mode (MSC6), external device control data mode (MSC8), trouble monitor data mode (MSC11) and count amount by coin data mode (MSC13) are executed (block 34). In the standby period also, the processing of the vend control data mode (MSC10) is always executed (block 35). Upon deposition of a coin, the ACS signal is present and the processing of the vend price data mode (MSC3) is executed (block 36). The delivery of the vend price data in this block 36 is executed with respect to one article (i.e., the i-th article) and i changes each time this block 36 is repeated in the loop of line 41. In other words, the processings in blocks 36–40 are executed with respect to one article which is the i-th one and these processings are executed sequentially for the respective articles by repetition thereof in the loop of line 41. In block 37, the processing of MSC10 is executed and in block 38 presence or absence of the OKSP signal concerning the i-th article is examined. In block 39, light indicating the vend possible state of the i-th article which has been judged vendible is lighted. In block 40, whether or not the article selection switch for this i-th article has been turned ON is examined and, if the result is YES, preparation for the vend operation is made in block 42. Nextly, the processing for the coin control data mode (MSC2) is executed (block 43) and, after executing the processing of MSC10 (block 44), the article delivery operation is started (block 45). In blocks 46, 47, 48, 49 and 50, the processings for the coin control data mode (MSC2), collected coin number by denomination data mode (MSC12), MSC10, settlement amount data mode (MSC4) and MSC2 are executed one by one. In blocks 43, 46 and 50 for the MSC2 mode which is repeatedly executed, states of the signals to be given to the coin mechanism side are changed.

In blocks 34, 35, 36, 37, 43, 44, 46–50 in which the processings of the respective modes are executed, the predetermined mode select codes MSC2-MSC13 are set in a state in which they can be delivered out and the I/OMODE program shown in FIG. 10 is executed.

The basic concept of sending and receiving of the signals between the coinmech control section 10 and the vendor control section 11 through the I/O port sections 16 and 22 is as shown in the tables below. A predetermined processing is executed in response to a signal state "1" or "0" of the control signal input ports CI and CIv and the control signal output ports CO and COv are set to a signal state "1" or "0" for demanding the opposite section to effect a next operation. In this way, employing the signal states at the control signal input and output ports CI–COv as key words, the control sections 10 and 11 which are operated by programs which are independent from each other send and receive signals between them in association with each other. Table 10 shows signal conditions at the control signal input and output ports (called C port hereafter) in the control sections 10 and 11 during the input mode (as viewed from the coinmech control section 10) and Table 11 shows similar signal conditions during the output mode (as viewed from the coinmech control section 10). Contents of processings listed in the rows of input are those executed in response to "1" or "0" at the control signal input ports CI and CIv and contents of processings listed in the rows of output are those executed when the control signal output ports CO and COv are set at "1" or "0".

TABLE 10

The signal conditions at C ports during the input mode.

| vendor control section 11 | | | | Coinmech control section 10 | | | |
|---|---|---|---|---|---|---|---|
| C ports | | Contents of processings | Order | C ports | | Contents of processings | Order |
| input CIv | "1" | Comparison of signal contents at INv port and OUv port is started. | 5 | input CI | "1" | Signal at IN port is set to RIN register. | 3 |
| | "0" | Next signal is set to RPO register. | 1 | | "0" | Contents of RIN are stored in MR memory. | 7 |
| output COv | "1" | Contents of RPO are set at OUv port and COv port is set to "1". | 2 | output CO | "1" | Contents of RIN are set to OU port and CO port is set to "1". | 4 |
| | "0" | If the comparison is coincidence, COv port is set to "0". | 6 | | "0" | After MR memory processing, CO port is set to "0". | 8 |

TABLE 11

The signal conditions at C ports during the output mode.

| vendor control section 11 | | | | Coinmech control section 10 | | | |
|---|---|---|---|---|---|---|---|
| C ports | | Contents of processings | Order | C ports | | Contents of processings | Order |
| input CIv | "1" | Signal at INv port is set to RPI register. | 3 | input CI | "1" | Next signal is set to ROU register. | 1 |
| | "0" | Contents of RPI are stored in MRv memory. | 7 | | "0" | Comparison of signal contents at IN port and OU port is started. | 5 |
| output COv | "1" | After MRv memory processing, COv port is set to "1". | 8 | output CO | "1" | Contents of ROU are set to OU port and CO port is set to "1". | 2 |
| | "0" | Contents of RPI are set to OUv port and COv port is set to "0". | 4 | | "0" | If the comparison is coincidence, CO port is set to "0". | 6 |

In Tables 10 and 11, the numbers in the column of order designate the order of processings between the coinmech control section 10 and the vendor control section 11. For example, in the input mode of the coinmech control section 10 (Table 10), a signal is delivered from the vendor control section 11 to the coinmech control section 10, so that the processing for setting a next signal to be delivered out to an output port data register RPO (hereinafter referred to as "RPO register") in the vendor control section 11 is designated as "order 1". This processing is executed following the processing of the order 8 concerning the preceding signal delivery in the coinmech control section 10. More specifically, upon setting of "0" at the CO port of the coinmech control section 10 by the processing of the order 8, the control signal to be given to the CIv port of the vendor control section 11 is turned to "0" and the step proceeds to the processing of the order 1.

With reference to Table 10, when the control signal given to the CIv port of the vendor control section 11 is "0", a next signal (4-bit parallel data) to be delivered to the coinmech control section 10 is set to the RPO register (order 1) and then the contents of the RPO register are set at the data output port OUv for delivery to the coinmech control section 10 and the COv port is simultaneously set to "1" (order 2). In the coinmech control section 10, a 4-bit parallel data signal which is given from the OUv port to the IN port when the control signal given from the COv port to the CI port is turned to "1" is loaded in the input port data register RIN (hereafter referred to as "RIN register") (order 3). Then the contents of this RIN register are set to an output port data register ROU (hereinafter referred to as "ROU register") and the contents of this ROU register are set at the OU port while the CO port is set to "1" (order 4). The contents of the RIN register may be supplied directly to the OU port, omitting the step of setting them to the ROU register. Thus, the data provided by the vendor control section 11 is received by the coinmech control section 10 and, when this data is stored in the RIN register, the contents of the RIN register are fed back to the vendor control section 11 through the OU port for confirmation and a signal "1" is delivered from the CO port. On the side of the vendor control section 11, the data given from the OU port to the INv port (i.e., returned for confirmation) is loaded in an input port data register RPI (hereinafter referred to as "RPI register") when the control signal given from the CO port to the CIv port is "1" and the contents of this data are compared with those of the RPO register, i.e., the contents of the OUv port (order 5). If coincidence of two contents has been confirmed as a result of the comparison, the COv port is set to "0" (order 6). When the contents of the 4-bit data (output of the OUv port) delivered from the vendor control section 11 and the 4-bit data (input to the INv port) received in the coinmech control section 10 and stored in the RIN register do not coincide with each other due to some error in transmission, the COv port is not set to "0" but remains "1". In the case of the transmission error, therefore, the step does not proceed to a next processing so that an erroneous operation of the device due to error data can be prevented. In the coinmech control section 10, the contents of the RIN register are stored in the data pool memory MR when the controlsignal given from the COv port to the CI port is turned to "0" (order 7). Since the contents of the RIN register have been fed back to the vendor control section 11 for collation and correctness of the contents of the RIN register has been confirmed, the data to be stored in the MR memory is not the signal given to the IN port but should correctly be the signal stored in the RIN register. After the storage processing in the MR memory, the CO port is set to "0" to demand the vendor control section 11 to deliver out a signal for a next cycle (order 8).

The processings for one cycle from the order 1 to order 8 in Table 10 are repeated by the number of times shown in the column of order concerning the processings of the respective input modes shown in Tables 1-5. The contents of the 4-bit data signals to be delivered out in the respective data delivery orders are as shown in Tables 1-5. The 4-bit data signals which have been stored by the processing of the order 7 for each cycle (order) are sequentially stored in the data pool memory MR and, when sending and receiving of the end code ENDC has finally been received, all signals for one mode that have been stored in the memory MR are transferred by block to a predetermined location in the RAM 14. In the coinmech control section 10, these signals which have thus been transferred by block to the predetermined location in the RAM 14 are used for performing the processings therein. Accordingly, only when all signals for one mode block have been sent and received correctly, this signal group can be utilized by the coinmech control section10 so that an erroneous operation due to an error in the signal transmission can be prevented.

The output mode shown in Table 11 is treated in the same principle as in the input mode shown in Table 10. Referring to Table 11, when the control signal given to the CI port of the coinmech control section 10 is "1", a next 4-bit parallel data signal to be delivered to the vendor control section 11 is set to the ROU register (order 1). Then the contents of the ROU register are set at the OU port for delivery to the vendor control section 11 and the CO port is set to "1" (order 2). In the vendor control section 11, when the signal given from the CO port to the CIv port is "1", the 4-bit parallel data given from the OU port to the INv port is loaded in the RPI register (order 3). The contents of this RPI register are subsequently stored in the RPO register and the contents of the RPO register are set at the OUv port and the COv port is set to "0" (order 4). The contents of the RPI register may be supplied directly to the OUv port, omitting the RPO register. When the data given from the coinmech control section 10 is thus received by the vendor control section 11 and stored in the RPI register, the contents of the RPI register are fed back to the coinmech control section 10 for confirmation and a signal "0" is given from the COv port to the CI port. In the coinmech control section 10, when a signal "0" is given to the CI port, the data given from the OUv port to the IN port is loaded in the RIN register and the contents thereof are compared with the contents of the ROU register, i.e., those of the OU port (order 5). If the comparison has resulted in coincidence, the CO port is set to "0" (order 6). In the vendor control section 11, the contents of the RPI register are stored in the data pool memory MRv when the control signal given from the CO port to the CIv port is turned to "0" (order 7). After the storage processing in MRv, the COv port is set to "1" to demand the coinmech control section 10 to deliver out a next signal (order 8).

The processings for one cycle from the order 1 to order 8 in Table 11 are repeated by the number of times shown in the row of order concerning the processings of the respective output modes shown in Tables 6-9. The contents of the 4-bit data signals to be delivered out in the respective data delivery orders are as shown in Tables 6-9. The 4-bit data signals which have been stored by the processing of the order 7 for each cycle (order) are sequentially stored in the data pool memory MRv in the vendor control section 11 and, when sending and receiving of the end code ENDc has finally been received, all signals for one mode that have been stored in the memory MRv are transferred by block to a predetermined location in the RAM 19. In the vendor control section 11, these signals which have thus been transferred by block to the predetermined location in the RAM 19 are used for performing the processings therein.

Detailed Description of the Data Sending and Receiving Processing Program

Figure 4:
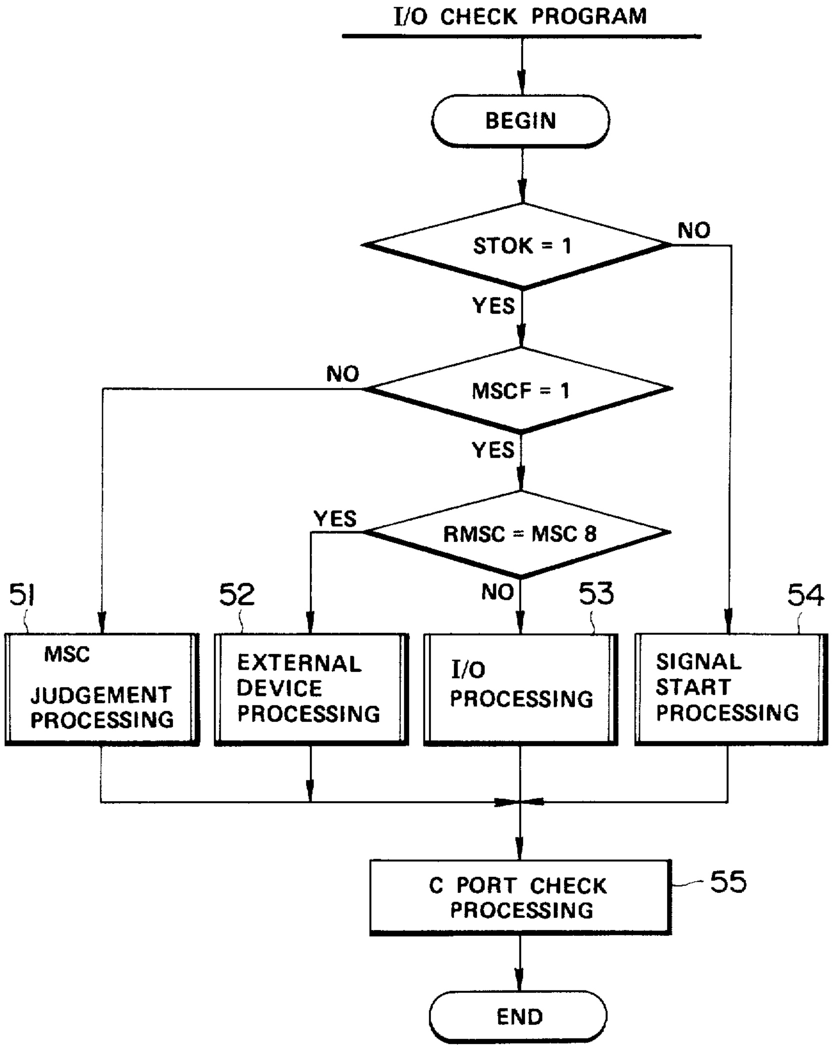
FIG. 4 is a flow chart showing an outline of an I/O port check program executed when necessary for checking signal states in input and output port sections in various steps of the program shown in FIG. 2.

FIG. 4 shows the entire flow of the I/O check program for effecting the input and output processings through the I/O port section 16 in the coinmech control section 10. Examples of the processings 51 to 55 are shown in detail in FIGS. 5 to 9, respectively. The character "N" on the flow lines from the judgement blocks indicates "NO" and the character "Y" "YES".

Figure 5:
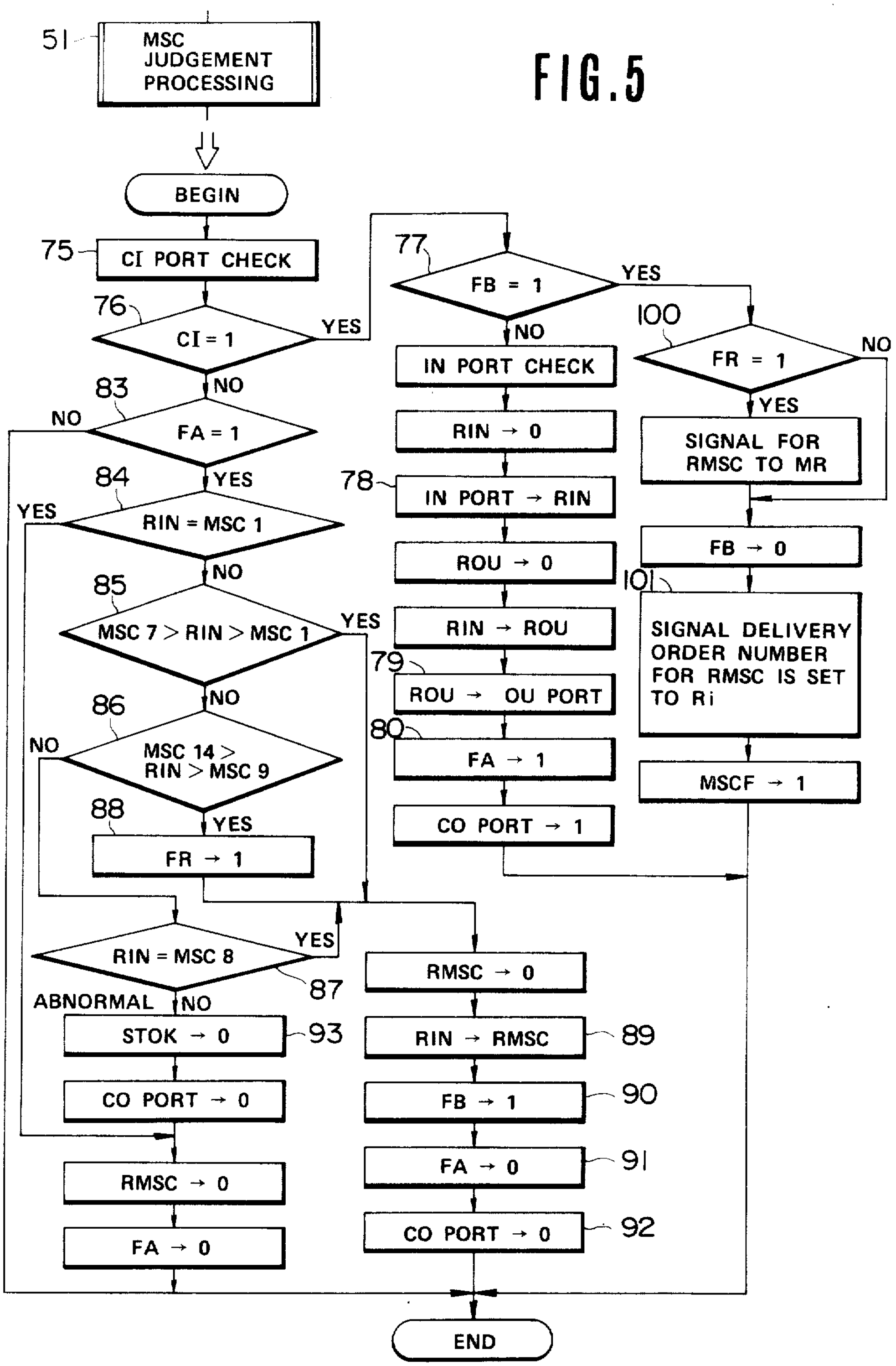
FIG. 5 is a flow chart showing in detail an example of an MSC (mode select code) judgement processing in FIG. 4.

The MSC judgement processing 51 is executed to judge whether or not the 4-bit data that was supplied from the vendor control section 11 to the IN port of the coinmech control section 10 through the OUv port is the mode select code MSC and to effect pertinent processings, setting the mode flag MSCF to "1" when it has been judged that the data is the mode select code MSC. The details are shown in FIG. 5.

Figure 6:
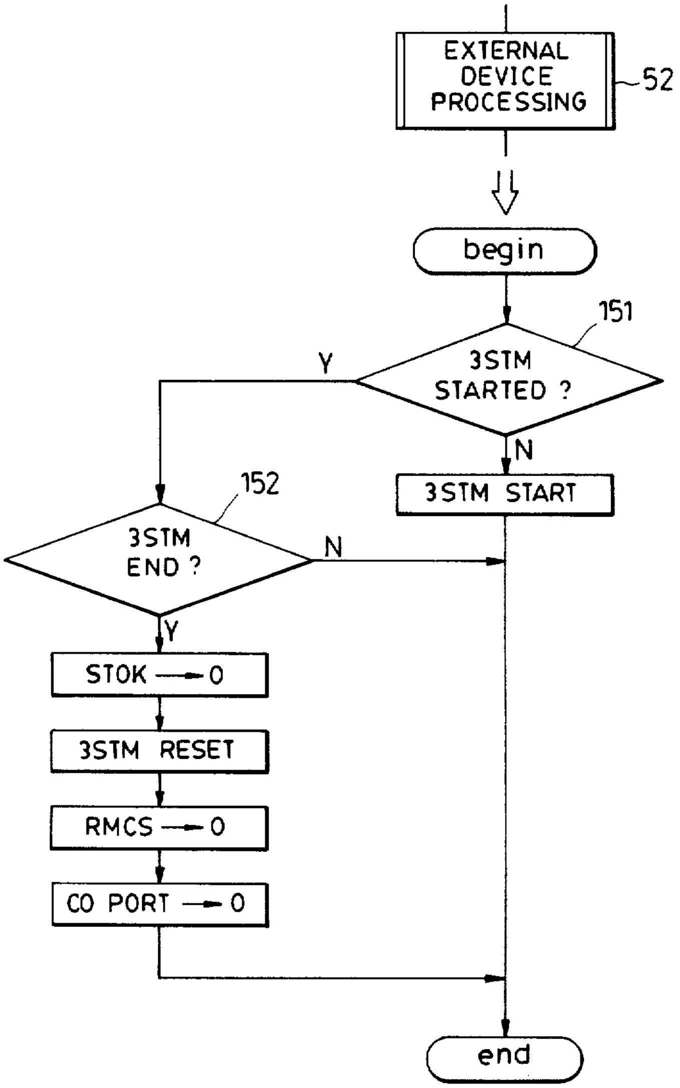
FIG. 6 is a flow chart showing in detail an example of an external device processing in FIG. 4.

The external device processing 52 is a processing executed when the external device control data mode was selected. The details are shown in FIG. 6.

Figure 7A:
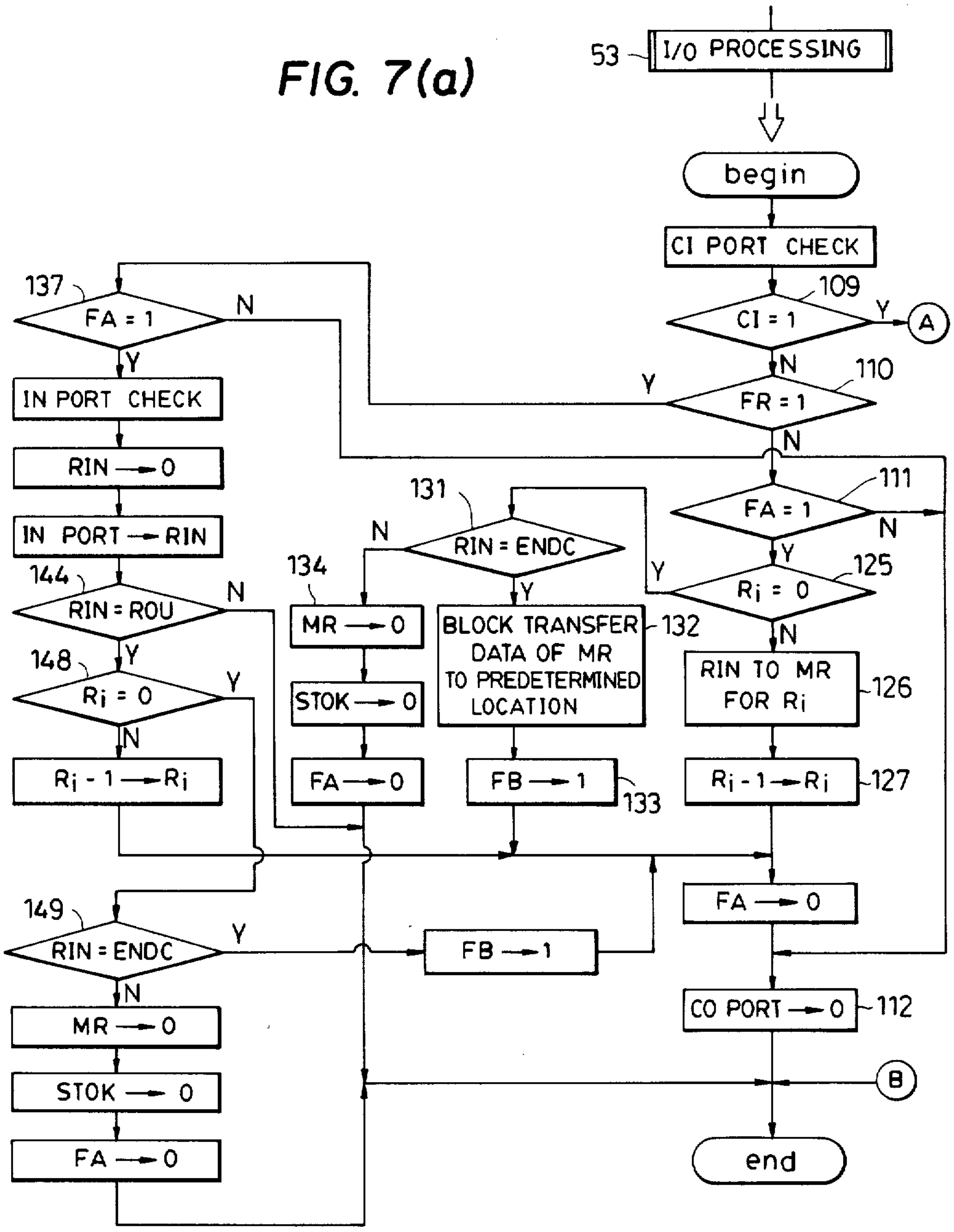
FIGS. 7(*a*) and 7(*b*) are flow charts showing in detail an example of an I/O processing in FIG. 4.
Figure 7B:
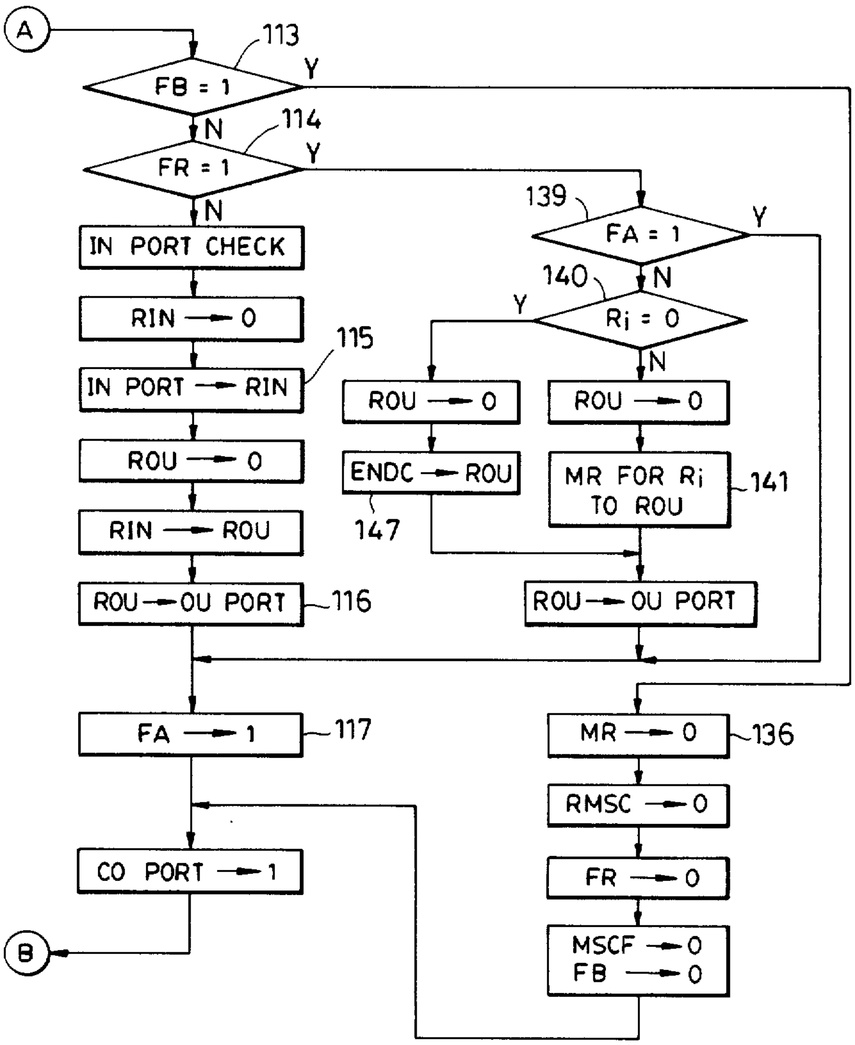

In the I/O processing 53, the 4-bit data signal sending and receiving processing in the input mode or output mode is executed according to the basic format shown in Tables 10 and 11 and the data sending format shown in Tables 1 to 9. The details are shown in FIGS. 7(*a*) and 7(*b*) which are connected together through junctions A and B.

Figure 8:
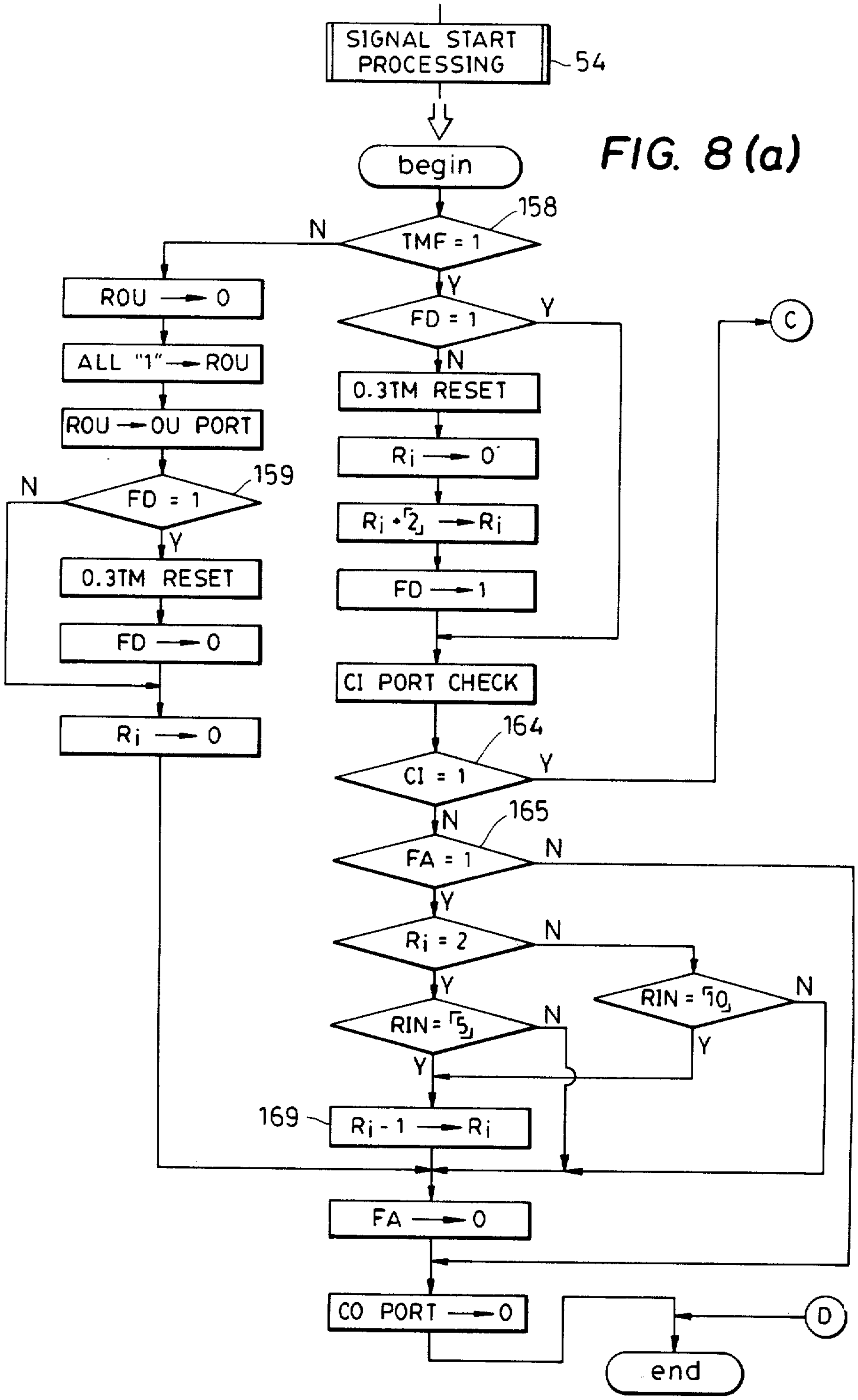
FIGS. 8(*a*) and 8(*b*) are flow charts showing in detail an example of a signal start processing in FIG. 4.
Figure 8B:
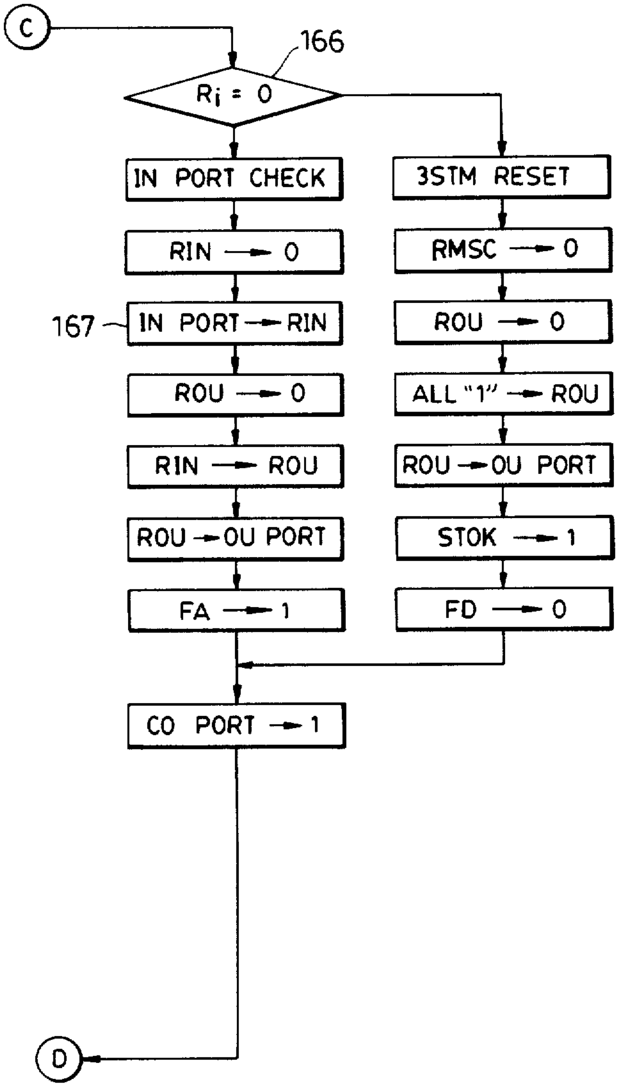

The signal start processing 54 is executed when the electric power is turned on or when abnormality was detected in the I/O port input and output signals of the vendor control section 11 or coinmech control section 10 to set these signals in a stand-by state by effecting the pace keeping (synchronization) of the input and output signals of the I/O port sections of both control sections 10 and 11. The details are shown in FIGS. 8(*a*) and 8(*b*) which are connected together through junctions C and D.

Figure 9:
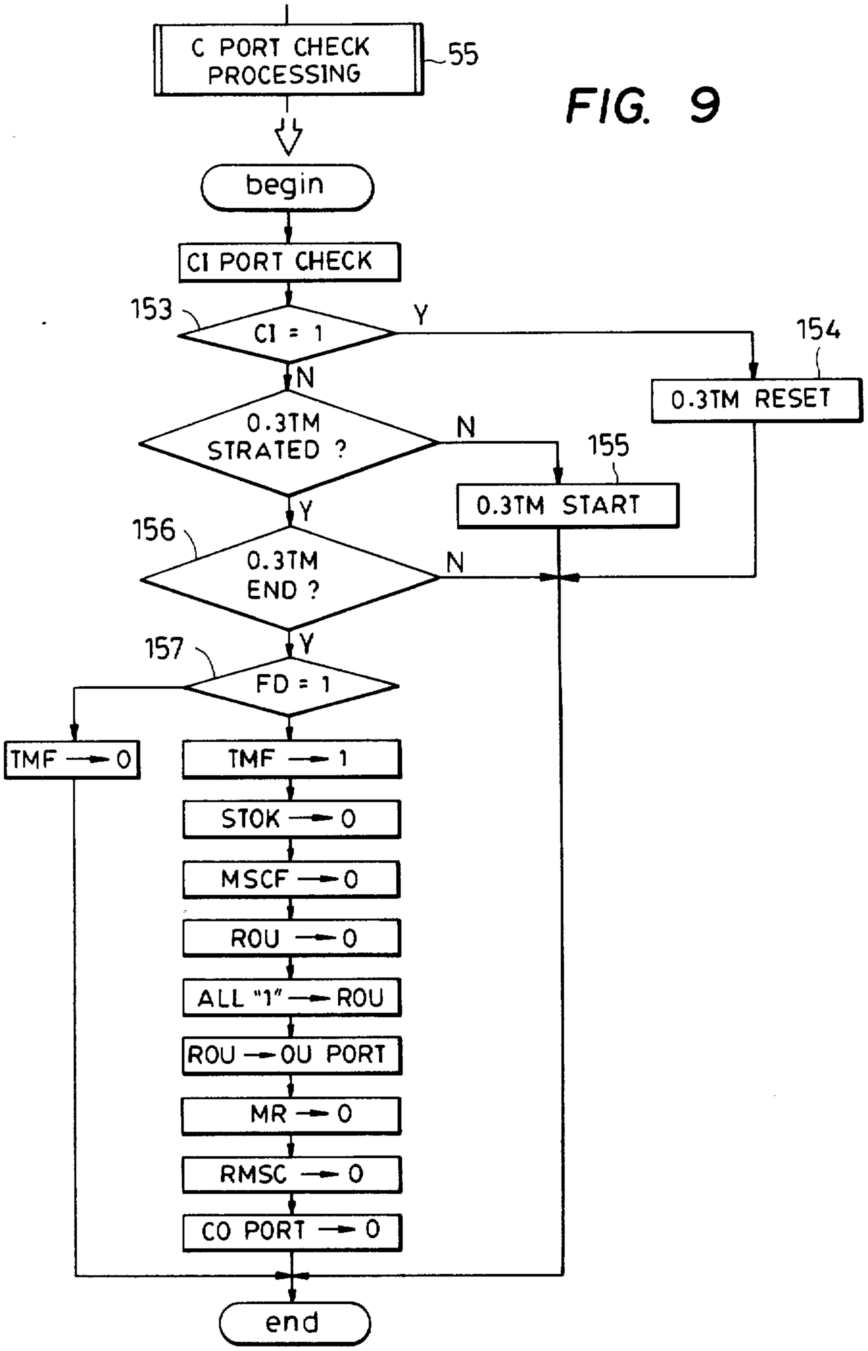
FIG. 9 is a flow chart showing in detail an example of a C port check processing in FIG. 4.

The C port check processing 55 is effected to check whether or not the control signal supplied to the control signal input port CI sustained "0" longer than a predetermined period of time and when in the affirmative, carries out a processing against the abnormality. When an abnormality was detected in both the I/O CHECK program of the coinmech control section 10 and the I/O MODE program of the vendor control section 11, the signal "0" is continuously supplied to the control signal output ports CO and COv. The C port check processing 55 is carried out to check whether or not the signal "0" was continuously delivered from the COv port of the vendor control section 11. The I/O MODE program of the vendor control section 11 is also provided with the C port check processing for the same purpose. The details are shown in FIG. 9.

The start processing finish flag STOK is set to "0" when the signal start processing 54 is to be carried out and set to "1" when this processing was executed.

In FIG. 4, the I/O CHECK program starts with checking whether or not the STOK flag is "1" and if NO, carries out the signal start processing 54 and, if YES, examines whether or not the mode flag MSCF is "1". When the arrival of the mode select code MSC is awaited, MSCF=1 is judged NO and the MSC judgement processing 51 is carried out. When the mode select code MSC has been already set and the sending and receiving of the signal related to the subject mode is to be carried out, MSCF=1 is judged YES so the step proceeds to checking whether or not the contents of the mode select code register RMSC is the external device control data mode MSC8 (RMSC=MSC8). If RMSC=MSC8, the external device processing 52 is carried out and if not, I/O processing 53 is effected. When the mode select code MSC was detected in the MSC judgement processing 51, the contents of the code (said MSC2 to MSC13) are set in the MSC register. The C port check processing 55 is executed in each round of the I/O CHECK program at the end.

FIG. 10 shows the entire flow of the I/O MODE program for effecting the input and output processing through the I/O port section 22 in the vendor control section 11. Examples of the processings 56, 58 to 60 are shown in detail in FIGS. 11 to 14. Although the I/O MODE program shown in FIGS. 10 to 14 and the I/O CHECK program shown in FIGS. 4 to 9 are executed separately using separate CPUs 12 and 17, the flags and registers of similar characteristics will be designated by the same reference characters between the two programs.

Figure 11:
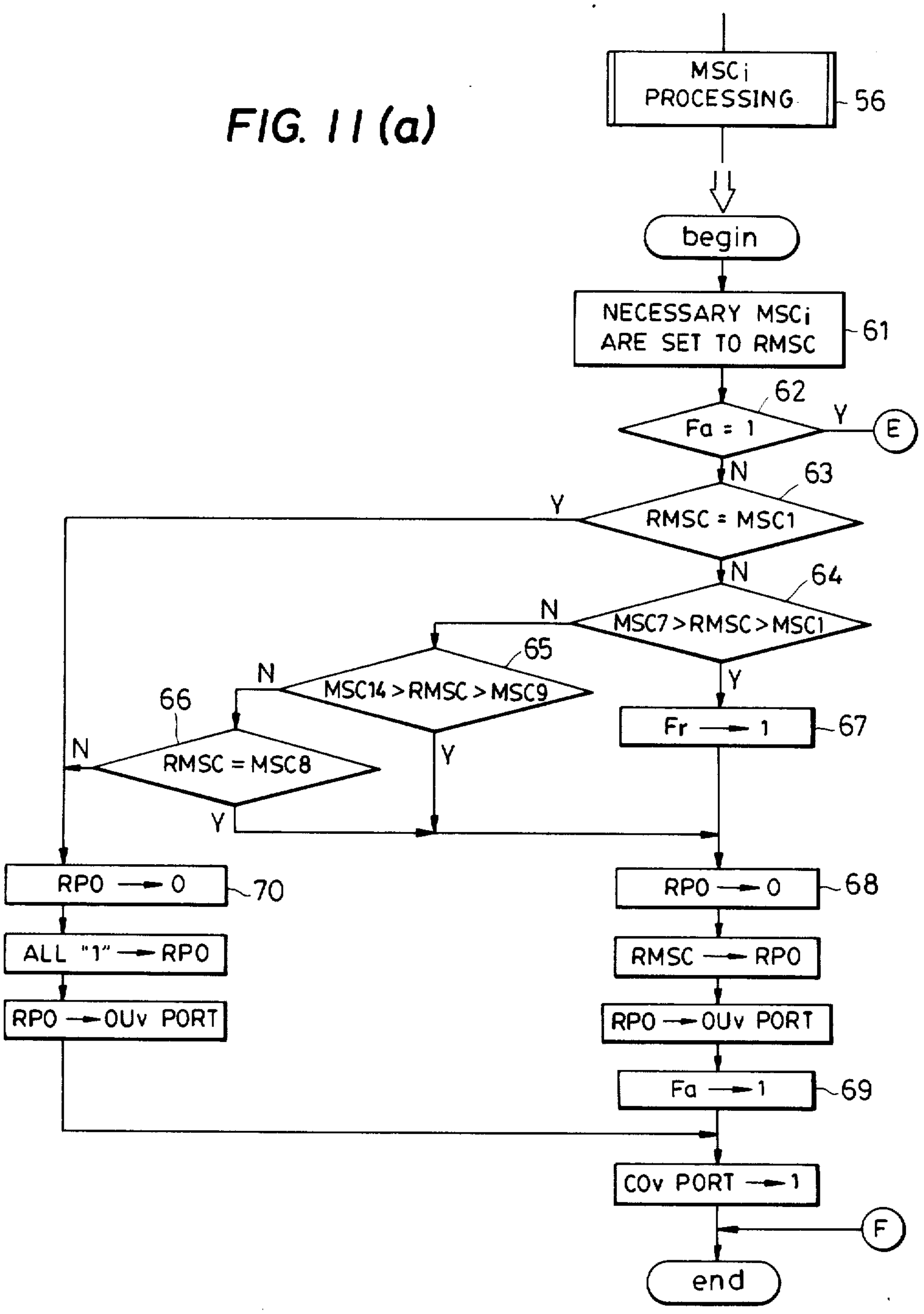
FIGS. 11(*a*) and 11(*b*) are flow charts showing in detail an example of an MSCi (particular mode select code) processing in FIG. 10.
Figure 11:
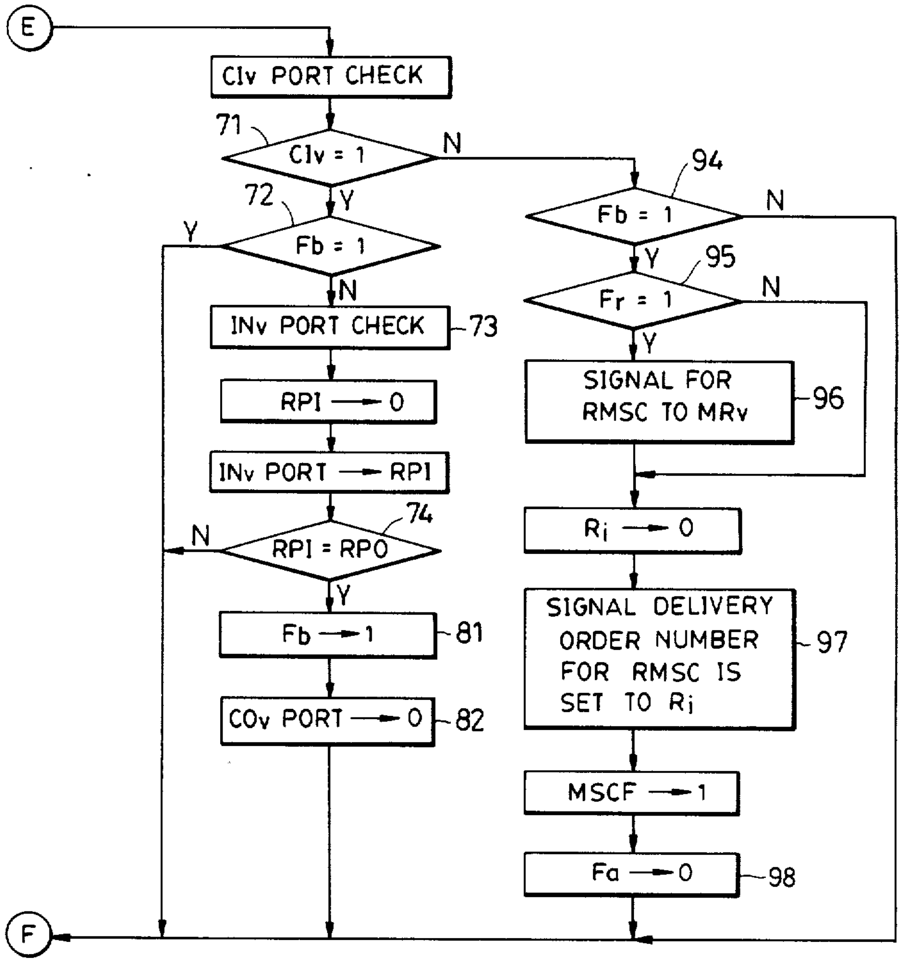

In the MSCi processing 56, the mode select code MSC is delivered from the vendor control section 11 to the IN port of the coinmech control section 10 through the OUv port. The details are shown in FIGS. 11(*a*) and 11(*b*) which are connected together through junctions E and F. MSCi designates one of the code values MSC2 to MSC13 of the mode select code MSC. The code values MSC1, MSC7, MSC9 and MSC14, which are not referred to in the previous explanation about the modes, correspond to "1111", "1001", "1110" and "0100", respectively (all headed by LSB and expressed such that the active state is represented by the low level). There exist no modes in this embodiment which correspond to these values.

The external device processing 57 is effected to carry out the data delivery processing for said external device control data mode. Detailed description thereof is omitted in respect of this embodiment.

Figure 12A:
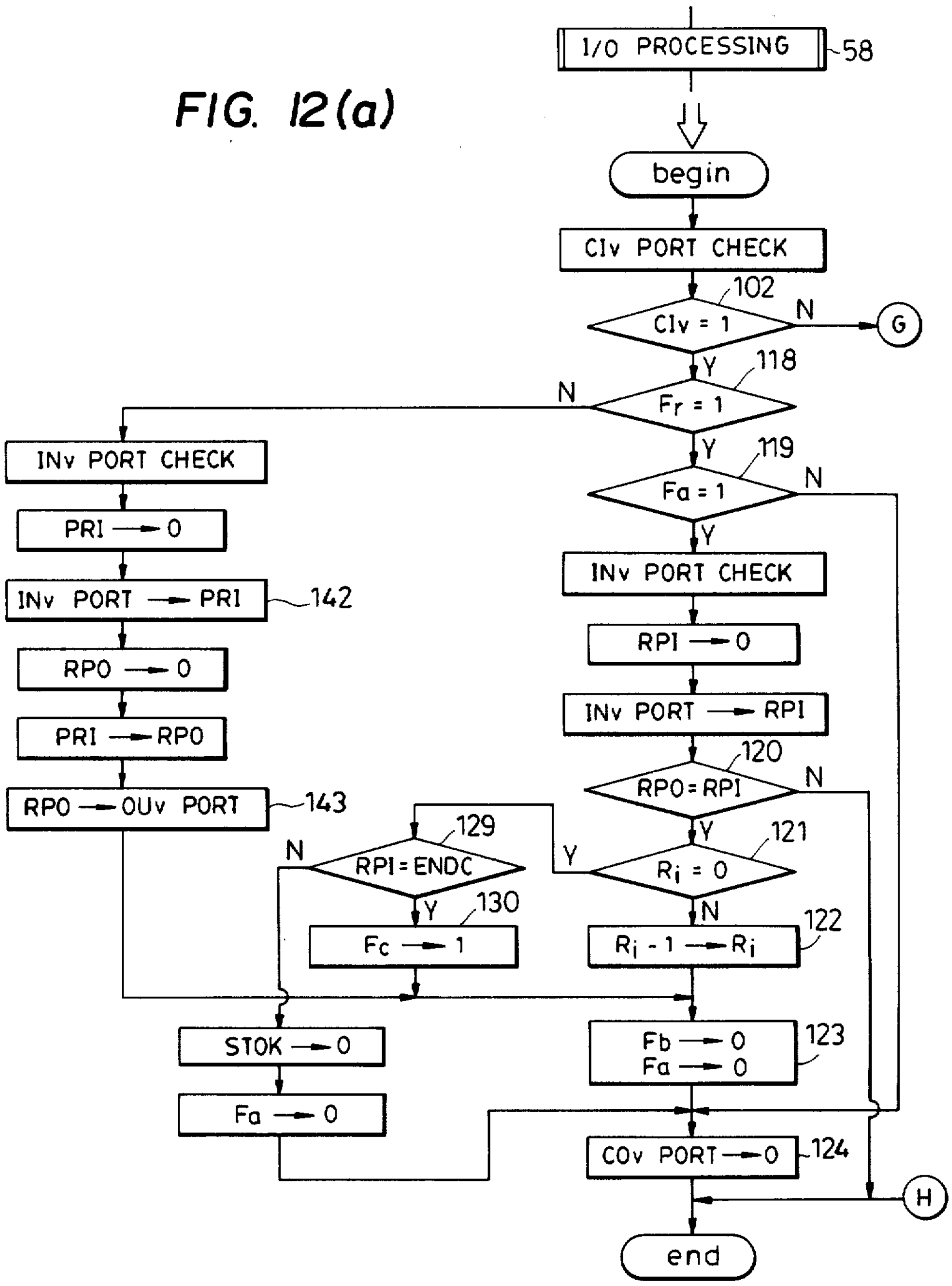
FIGS. 12(*a*) and 12(*b*) are flow charts showing in detail an example of an I/O processing in FIG. 10.
Figure 12B:
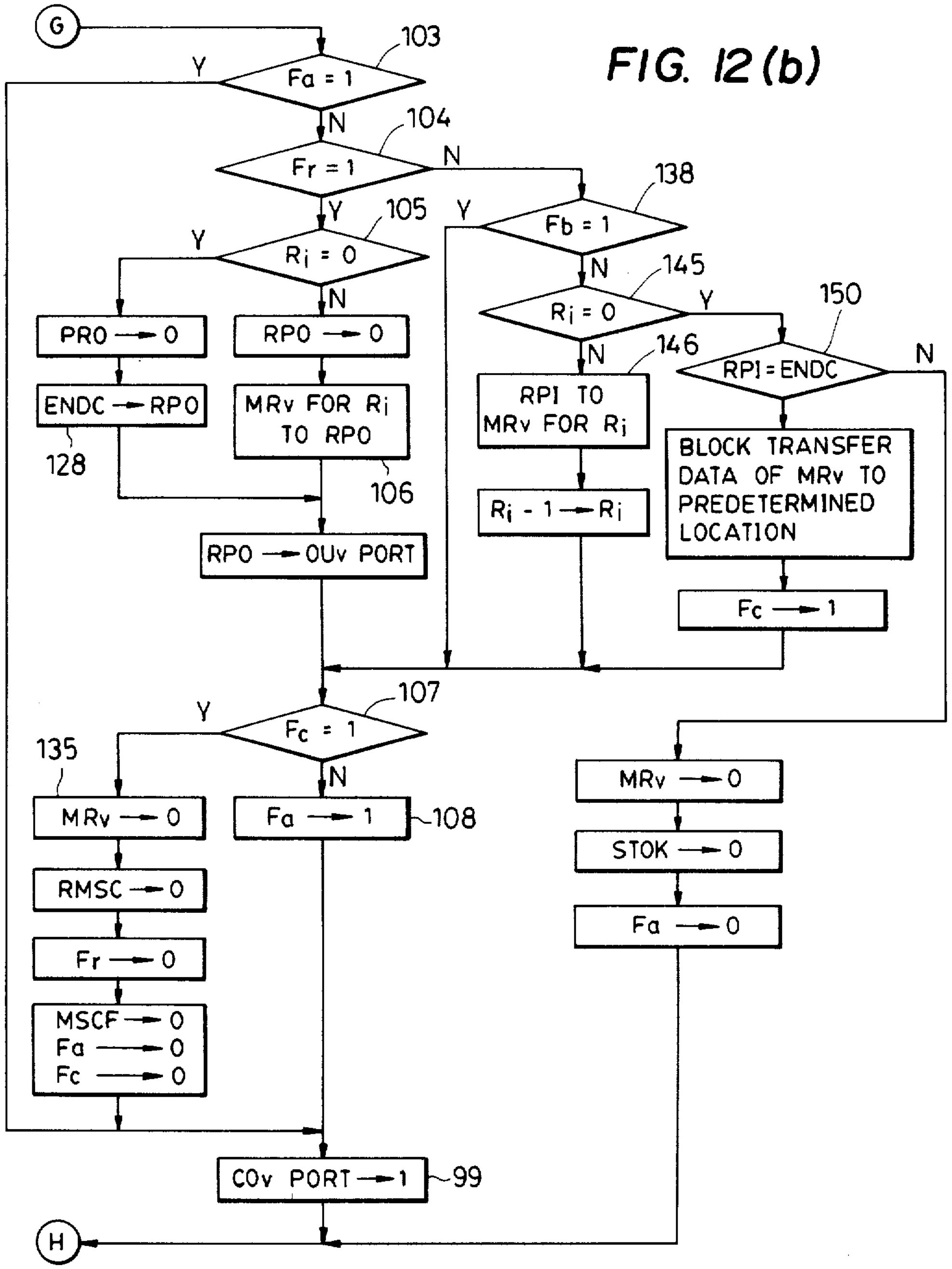

The I/O processing 58, signal start processing 59 and C port check processing 60 are provided to effect similar processings in the vendor control section 11 to those 53, 54 and 55 previously described, respectively having the same names. The details are shown in FIGS. 12(*a*) and 12(*b*), 13 and 14, respectively. FIGS. 12(*a*) and 12(*b*) are connected together through junctions G and H.

The flow of processings in FIG. 10 is the same as that shown in FIG. 4 and the flags STOK, MSCF and register RMSC in FIG. 10 are also of the same characteristics as those shown in FIG. 4.

The respective processings will now be described in detail in the signal sending and receiving order.

(1) Sending and receiving of the mode select code

Until the mode select code MSC is delivered, the mode flag MSCF on the side of the vendor control section 11 is "0" so that the MSCi processing 56 is executed in the I/O MODE program in FIG. 10.

The flags and register used in the MSCi processing 56 in FIG. 11 are as follows.

Fa . . . individual data sending and receiving flag

Fb . . . sending finish mode select code check finish flag

Fr . . . data sending mode flag (as viewed from the side of the coinmech control section 10)

Ri . . . order register

Meanwhile, the MSC judgement processing 51 in FIG. 5 is executed at this time in the I/O CHECK program on the coinmech side.

The flags and register used in the MSC judgement processing 51 in FIG. 5 are as follows.

FA . . . individual data sending and receiving flag

FB . . . data block sending and receiving processing finish flag

FR . . . output mode flag

Ri . . . order register

To deliver the mode select code MSC, the processing of block 61 in the MSCi processing 56 in FIG. 11 is first carried out to set the code MSCi to be delivered in the register RMSC. When the code is yet to be delivered, the flag Fa is "0" so that block 62 is judged NO. In that case, blocks 63 to 66 examine whether or not the contents of the register RMSC (MSCi) are MSC1, whether MSC7<RMSC<MSC1 (i.e., whether RMSC is one of MSC2 to MSC6 corresponding to the input mode of the coinmech control section 10 or the data delivery mode of the vendor control section 11), whether MSC14<RMSC<MSC9 (i.e., whether RMSC is one of MSC10 to MSC13 corresponding to the output mode of the coinmech section 10 or the data receiving mode of the vendor control section 11) and whether or not RMSC is MSC8. In the data delivery mode of the vendor control section 11, the flag Fr is set to "1" (block 67). Where any mode has been selected, the step proceeds to block 68 to clear the register RPO to "0", then set the mode select code MSCi of the register RMSC in RPO and supply this code MSCi of RPO to the OUv port. Thereafter, the flag Fa is set to "1" in block 69 and the signal "1" is supplied to the COv port. Meanwhile, if MSCi set in RMSC does not correspond to any mode, the step proceeds to block 70 to clear RPO to "0" and set all 1s in RPO (meaning absence of data), which is supplied to the OUv port. Fa is not set in this case. Once delivery of the mode select code has been started, block 62 is judged YES in the next cycle so that the signal of the CIv port is checked. Because of the active low system employed in this embodiment, CIv is normally "1" and, initially, block 71 is judged YES and the next block 72 or Fb=1 is judged NO. In block 73 for the INv port check, the INv port signal is taken, the register RPI is cleared to "0" and the INv port signal is set in RPI. Block 74 compares the signal in the register RPI taken from the INv port and the signal in the register RPO produced from the OUv port and waits until they coincide with each other.

Meantime the coinmech control section 10 separately carries out the MSC judgement processing 51 in FIG. 5 whereby the CI port signal is taken in block 75 for "CI port check" and examined in block 76 to see whether or not it is "1". The indications "-port check" in blocks all mean taking in the signal supplied to the respective ports. The flowchart includes specific indications that, before new data is to be written into a register, the register must be cleared to "0" (e.g., blocks 68, 70 in FIG. 11). However, description hereinbelow will not refer to "-port check" or "register clearing processing". Initially, as before, the signal supplied from the COv port to the CI port is "1" so that block 76 is judged YES. Since the flag FB is still "0", next block 77 is judged NO so that the data from the IN port is set in the register RIN (block 78), the contents of the register RIN are set also in the ROU register and provided from the OU port (block 79), the flag FA is set to "1" (block 80) and the CO port output signal is set to "1". This processing is repeated until the CI port goes to "0".

Meanwhile in FIG. 11, block 74 repeats comparing the signal returned by the processing 79 in FIG. 5 (the contents of the RPI register) and the produced signal (the contents of the RPO register). When coincidence between these signals is confirmed, the flag Fb is set to "1" (block 81) and the COv port output is set to "0" (block 82).

In FIG. 5, block 76 is judged NO since the signal supplied from the COv port to the CI port has gone to "0" so that the flag FA is examined in block 83. Block 80 is judged YES as the flag FA is set so that blocks 84 to 87 examine, as before, whether or not the contents of the input register RIN (i.e, mode select code MSCi) are MSC1, whether or not MSC7>RIN>MSC1, whether or not MSC14>RIN>MSC9 or whether or not it is MSC8. As will be clear from the previous description, block 86 is judged YES in the output mode so that the output mode flag FR is set to "1" (block 88). In the output mode, input mode (where block 85 is judged YES) or the external device control data mode (where block 87 is judged YES), the mode select code MSCi in the RIN register is set in the RMSC register (block 89), the flag FB is set to "1" (block 90), the flag FA is reset to "0" (block 91), and the CO port output is set to "0" (block 92). Where block 87 is judged NO, abnormality is indicated so that the STOK flag is set to "0" (block 93) and then the CO port is set to "0".

In FIG. 11, the step through YES of blocks 71 and 72 is repeated until the CIv port goes to "0". The processing of block 92 causes the CO port to go to "0", which in turn causes the CIv port to go to "0" and, accordingly, the step proceeds from NO of block 71 to NO of block 94, where the flag Fb is examined. Since the flag Fb was set in block 81, block 94 is judged YES and the flag Fr is examined in block 95. In case of the data sending mode (the input mode on the coinmech side), the processing of block 96 is carried out so that a set of 4-bit data signals (see FIGS. 1 to 5) corresponding to the mode stored in the RMSC register is drawn from a predetermined location of RAM 19 and stored in the data pool memory MRv. In the case of data receiving mode (the output mode on the coin mechanism side), block 96 is not executed. Next, the signal delivery order number corresponding to the mode stored in the RMSC register is set in the order register Ri (block 97). This signal delivery order number is the maximum (6, 12 or 18) of the numbers given in the row of order shown in Tables 1 to 9. The mode flag MSCF is then set to "1" and the flag Fa is reset (block 98).

Meanwhile in FIG. 5, since the processing of block 91 has reset the FA flag to "0", the step circulates through NO of blocks 76 and 83 while the CI port input singal (i.e., the COv port output, which has been set to "0" in block 82 in FIG. 11) remains "0". Thereafter, the CI port input signal goes to "1" when, as will be described later, the processing of block 99 (FIG. 12(*b*)) sets the COv port to "1", and the step therefore proceeds through YES of block 76 and YES of block 77 (FB has been set to "1" in block 90) up to block 100. Block 100 judges whether or not the data is in the output mode (FR=1). If YES, a set of 4-bit data signals (see Tables 6 to 9) corresponding to the mode stored in RMSC is drawn from a predetermined location of RAM 14 and stored in the data pool memory MR. If NO (in case of input mode), this processing is not carried out. The flag FB is then reset to "0" and the signal delivery order number corresponding to the mode stored in the RMSC register is set in the order register Ri (block 101). The mode flag MSCF is then set to "1".

(2) Data Sending and Receiving in the Case of Input Mode (Data delivery mode in the vendor control section 11)

Thus, once mode flag MSCF is set to "1", the I/O processings 53 and 58 are executed unless the subject mode is the external device control data mode MSC8 (see FIGS. 4 and 10).

In the case of input mode (as viewed from the coinmech control section 10), the output mode flag FR of the coinmech control section 10 and the data delivery mode flag of the vendor control section 11 are set or reset respectively as follows:

FR="0"

Fr="1"

In the I/O processing 58 in the vendor control section 11 shown in FIG. 12, block 102 first examines whether or not the CIv port input signal is "1". When the first (order 1) 4-bit data is to be delivered, block 102 is judged NO because the CO port output signal on the coin mechanism side has been set to "0" by the processing of block 92 in FIG. 5. Since the Fa flag is "0", block 103 is also judged NO so that the step proceeds through YES of block 104 "Fr=1" up to block 105 which examines whether or not the order register Ri is "0". Since, as mentioned above, the Ri register is initially loaded with a predetermined signal delivery order number, "Ri=0" is judged NO and the processing of block 106 is carried out to read 4-bit data from a predetermined address of the MRv memory corresponding to the contents of the Ri register and load the RPO register therewith. It is noted that the arrangement of addresses in the MRv memory (and the MR memory as well) is contrary to the data delivery order shown in Tables 1 to 9. For instance, 4-bit data with delivery order numbers 1, 2, 3, 4, 5 and 6 are stored respectively in addresses 6, 5, 4, 3, 2 and 1 designated by the Ri register. Therefore, based on the contents of the Ri register where the order numbers corresponding to the maximum value are stored, the 4-bit data to be first delivered (order 1) is read from the MRv memory and stored in the RPO register. The contents of the RPO register are produced from the OUv port and applied to the IN port on the coin mechanism side.

Block 107 examines the data block sending and receiving processing finish flag Fc. Since the Fc flag is still "0", the individual data sending and receiving flag Fa is set to "1" in block 108 and then the COv port output signal is set to "1" in block 99. These processings correspond to those of order numbers 1, 2 in Table 10. Once the delivery data is set in the OUv port, the step through NO of block 102, YES of block 103, and block 99 is repeated until "1" is supplied to the CIv port.

Meantime in the I/O processing 53 in the coinmech control section 10 shown in FIG. 7, the step proceeds through NO of block 109 or "CI=1", NO of block 110 or "FR=1", and NO of block 111 or FA=1, to block 112 where the CO port is set to "0" until the COv port supplies "1" to the CI port, that is, while the CI port input is "0". When, as described above, the first 4-bit data is delivered from the vendor side and the COv port output is set to "1" (block 99 in FIG. 12), block 109 or CI=1 is judged YES so that the data block sending and receiving processing finish flag FB is examined in block 113. Since FB=0 as yet, the step proceeds to block 114 to examine FR=1. Since the data is as yet in the input mode, block 114 is judged NO so that the 4-bit data supplied from the OUv port of the vendor control section 11 to the IN port of the coinmech control section 10 is stored in the RIN register (block 115), then set in the ROU register, supplied to the OU port and returned to the vendor control section side (block 116). Thereafter, the individual data sending and receiving flag FA is set to "1" (block 117) and the CO port is set to "1". These processings correspond to those of order numbers 3, 4 shown in Table 10 previously given.

In FIG. 12, as "1" has been set in the CO port, block 102 or CIv=1 is judged YES and next block 118 Fr=1 is judged YES because the data is now in the delivery mode and the Fa flag is examined in block 119. As mentioned above, since the Fa flag has been set to "1" in block 108, Fa=1 is judged YES so that the data that was returned to the INv port is set in the RPI register to compare the contents of RPI and the contents of the delivered data stored in the RPO register (block 120). If these do not coincide, the processings of blocks 102 to 120 are repeated until they coincide. When the coincidence between the two data is confirmed, the step proceeds to block 121 to judge whether or not the contents of the Ri register are "0". Unless delivery of all data in one mode is completed, Ri=0 is judged NO and a decimal 1 is subtracted from the contents of the Ri register in block 122 and the remainder becomes the fresh contents of the Ri register. In next block 123, the Fb flag and Fa flag are reset to "0". The COv port output signal is then set to "0" in block 124. These processings correspond to those of order numbers 5 and 6 in Table 10.

In FIG. 7, because the COv port was set to "0", the CI port input, to which this COv port output is supplied, goes to "0". Therefore, the step proceeds through NO of block 109, NO of block 110 and YES of block 111 (because FA was set to "1" in block 117) to block 125, which examines whether or not the contents of the register Ri are "0". Unless receiving of all data in one mode is completed, Ri=0 is judged NO so that in block 126 the contents of the RIN register are stored in a predetermined address of the data table memory MR corresponding to the contents of the Ri register. Thereafter 1 is subtracted from the order number of the Ri register (block 127), the FA flag is reset to "0" and the CO port output is set to "0". These processings correspond to those of order numbers 7 and 8 in Table 10.

In FIG. 12, when the CIv port input signal (i.e., the CO port output signal) has gone to "0", the step proceeds from NO of block 102 to block 103 and further through blocks 104, 105 up to block 106, where the signal to be next delivered is read from a predetermined address of the MRv memory corresponding to the contents of the Ri register (which are the remainder obtained by subtracting a 1 from the preceding contents of Ri in block 122) and set in the RPO register. Thus the order of the delivered signal advances and the same processings as above (corresponding to those of order numbers 1 to 8 in Table 10) are repeated.

When delivery of all the signals in one mode is completed, the contents of the Ri register go to "0" so that block 105 in the next cycle is judged YES. Then the end code ENDC (all 0s) is set in the RPO register by the processing of block 128 and delivered from the OUv port. The COv port is then set to "1" (block 99).

In FIG. 7, since the signal supplied from the COv port to the CI port has gone to "1", the step proceeds through YES of block 109, NO of block 113 and NO of block 114. Thereafter the end code ENDC is set in the RIN register and returned to the vendor control section 11 through the OU port (blocks 115, 116). Then the CO port is set to "1".

In FIG. 12, since the signal supplied from the CO port to the CIv port has gone to "1", the end code ENDC returned from said OU port to the INv port is stored in the RPI register and the contents of RPI and RPO are compared (block 120). The sending and receiving of the end code ENDC is thus confirmed, whereon the step proceeds through YES of block 121 to block 129 to confirm that the contents of the RPI register are the end code ENDC. Then the data block sending and receiving processing finish flag Fc is set to "1" in block 130. Thereafter, Fb, Fa are reset to "0" and the COv port is set to "0". In the meantime, NO of block 129 indicates abnormality so that the STOK flag is reset to "0" (the Fa flag is also reset at the same time) to enable the signal start processing 59 to be effected.

In FIG. 7, upon detecting that the CI port input has gone to "0", the step proceeds through NOs of blocks 109 and 110 and YESes of blocks 111 and 125 to block 131 which checks that the contents of the RIN register are the end code ENDC. If block 131 is judged YES, all the signals for one mode that have been stored in the data pool memory MR and transferred by block to a predetermined location in RAM 14 (block 132) and stored therein. Then the data block sending and receiving processing finish flag FB is set to "1" (block 133), the FA flag is reset and the CO port output is set to "0". If block 131 is judged NO, abnormality is indicated so that the memory of the MR memory is all cleared (block 134) and the STOK flag and FA flag are reset respectively to leave this I/O processing for the following signal start processing 54.

In FIG. 12, because the signal supplied from the CO port to the CI port has gone to "0", block 102 is judged NO and the step proceeds through NO of block 103, YESes of blocks 104 and 105 and block 128 up to block 107 which judges whether or not Fc=1. Since Fc=1 was obtained in block 130 previously, block 107 is judged YES and the step proceeds to block 135 which clears the data pool memory MRv. Further the mode select code register RMSC, data delivery mode flag Fr, mode flag MSCF, flags Fa, Fc are reset to "0" and COv port is set to "1", respectively thereby leaving the I/O processing 58.

In FIG. 7, because the signal supplied to the CI port from the COv port has gone to "1", the step proceeds from YES of block 109 to block 113 to examine the FB flag. Since the FB flag was set to "1" in block 133 previously, block 113 is judged YES so that the MR memory is cleared in block 136. Further the RMSC register and the respective flags FR, MS, CF and FB are reset and the CO port is set to "1" to leave the I/O processing 53.

(3) Data Sending and Receiving in the Output Mode (or data receiving mode in the vendor control section 11)

In the case of the output mode, the output mode flag FR of the coinmech control section 10 and the data delivery mode flag Fr of the vendor control section 11 are set as follows:

FR=1

Fr=0

The MSCi processing 56 (FIG. 11) and the MSC judgement processing 51 (FIG. 5), before taking said modes, have been stopped with the respective control signal output ports CO, COv set to "0" (processings of blocks 82 and 92). Therefore in the first cycle of the I/O processing 53 on the coin mechanism side, block 109 in FIG. 7 is judged NO, block 110 (FR=1) YES and block 137 (FA=0) NO so that the CO port is set to "0" in block 112 and this processing is repeated. In the first cycle of the I/O processing 58 on the vendor control section side, block 102 in FIG. 12 is judged NO, block 103 (Fa=0) NO and block 104 (Fr=0) NO to proceed to block 138. Since the Fb flag has been set to "1" in block 81 (FIG. 11) in MSCi processing 56, block 138 or Fb=1 is judged YES and the step proceeds through NO of block 107 to set the Fa flag and the COv port to "1". Thus signal delivery is now demanded against the coinmech control section 10.

In FIG. 7, since CI=1, the step proceeds through YES of block 109, NO of block 113, and YES of block 114 (because FR=1) to block 139 which judges whether or not FA=1. As data delivery has not yet started, the FA flag is "0", thus proceeding to block 140. Since initially a maximum order number is stored in the order register Ri, Ri=0 is judged NO so that 4-bit data (order 1 data first) is read from the address of the MR memory corresponding to the contents of the Ri register, set in the ROU register (block 141) and produced from the OU port. Then FA and the CO port are successively set to "1". The above processings correspond to those of order numbers 1 and 2 shown in previous Table 11.

In FIG. 12, since CIv=1, the step proceeds through YES of block 102, NO of block 118 (because Fr=0) to "INv port check" and the 4-bit data signal supplied from the OU port on the coin mechanism side to the INv port is stored in the RPI register (block 142). Then the contents of RPI are also set in RPO and then the contents of RPO are set in the OUv port (block 143). Thus, 4-bit data received from the coin mechanism side is returned for confirmation. Then the Fb and Fa flags are reset to "0" and the COv port is set to "0". Those processings correspond to those of order numbers 3 and 4 in Table 11.

In FIG. 7, since CI=0, the step proceeds through NO of block 109, YES of block 110 and YES of block 137 (because FA has already been set) to reach "IN port check", loading the RIN register with the data that has been returned to the IN port. This processing is repeated until block 144, which compares the delivered data (contents of ROU) and the returned data (contents of RIN), detects coincidence. Upon detection of coincidence, if Ri=0 is judged NO in block 148, "1" is subtracted from the order number of Ri to designate the subsequent delivery order. Then FA and the CO port are set to "0" successively. The above processings correspond to those of order numbers 5 and 6 in Table 11.

In FIG. 12, since CIv=0, the step proceeds through NO of block 102, NO of block 103, NO of block 104 and NO of block 138 to reach block 145. If Ri=0 is judged NO in this block 145, the step proceeds to block 146 where the data that has been set in the RPI register is stored in the address of the MRv memory corresponding to the contents of the Ri register. Then "1" is subtracted from the order number of Ri to designate the order of the number to be delivered next. Thereafter Fa and the COv port are set to "1" successively. The above processings correspond to those of order numbers 7 and 8 in Table 11. Thus by setting the COv port to "1" when sending and receiving processing of one data has ended, delivery of next data is demanded against the coinmech control section 10 to repeat the same processings (those corresponding to order numbers 1 to 8 in Table 11) as described above.

When sending and receiving of all data in one mode has finished, block 140 (Ri=0) in FIG. 7 is judged YES so that the end code ENDC is set in the ROU register (block 147) and produced from the OU port. Then the CO port is set to "1". In FIG. 12, the step proceeds through YES of block 102, NO of block 118 so that the end code ENDC supplied to the INv port is set in the RPI register and then produced from the OUv port through the RPO register. Then the COv port is set to "0". In FIG. 7, the step proceeds through NO of block 109, YES of block 110, and YES of block 137 to reach block 144 to confirm sending and receiving of the end code ENDC (RIN=ROU). The step further proceeds through YES of block 148 to block 149 to check whether or not the data returned to the RIN register is certainly the end code ENDC. If YES, the FB flag is set to "1" and the CO port to "0". If NO, abnormality is indicated so that the MR memory is cleared and the STOK flag is reset to "0".

In FIG. 12, since CIv=0, the step proceeds through NO of block 102 and further through blocks 103, 104, 138 and 145 to block 150 to check whether or not the contents of the RPI register are the end code ENDC. If YES, all the signals for one mode pooled in the MRv memory are transferred by block and stored in a predetermined location of RAM 19 and the flag Fc is set to "1". Fc=1 is judged YES in next block 107 and the MRv memory, RMSC register, flags Fr, MSCF, Fa and Fc are respectively reset to "0" and the COv port is set to "1". If block 150 is judged NO, abnormality is indicated so that the contents that have been pooled in the MRv memory are cleared and the STOK flag is reset to "0".

In FIG. 7, since CI=1 and FB=1, the step proceeds through blocks 109, 113 to block 136, resetting the MR memory, RMSC register and the flags FR, MSCF, and FB. The CO port is then set to "1". Thus sending and receiving of all the signals for one mode is completed to leave the I/O processings 53, 58 (as MSCF was set to "0").

(4) External Device Processing

Where, for instance, an external printer is connected to the I/O port section 22 of the vendor control section 11 to print out sales data and the like stored in the peripheral memory 21, the external device control data mode (MSC8) is selected. In this case, the coinmech control section 10 executes the external device processing 52 shown in FIG. 6, virtually disregarding the signal supplied to the I/O port 16 from the vendor control section 11 side. If, for instance, the processing by an external device is completed within 3 seconds (or any other predetermined time period), the coinmech control section 10 waits 3 seconds without performing the I/O port processing operation. That is, a 3-second timer 3STM is started to provide a 3-second standby period during which the step through YES of block 151 and NO of block 152 is repeated. When the 3-second standby period has elapsed, block 152 is judged YES so that the STOK flag is reset to "0", the timer 3STM and the register RMCS are successively reset and the CO port is set to "0", thus leaving the processing 52. The reason for setting STOK and the CO port to "0" is to have the signal start processings 54 and 59 effected to ensure that the I/O port input and output of both control sections 10, 11 keep pace with each other and thereafter proceed to the normal processings 51, 53, 56 and 58.

(5) C Port Check Processing

Almost the same C port check processings 55 and 60 are effected on the coinmech control section side and the vendor control section side. Therefore, description will now be made below referring to FIG. 9, omitting description of FIG. 14.

This C port check processing 55 starts with the checking as to whether or not the CI port input signal sustained "0" longer than a predetermined time period (e.g., 0.3 sec), followed by proper processings. If the CI port input is "1" (YES of block 153), the 0.3-second timer (0.3 TM) is reset (block 154) to end the processing 55. In case the CI port input is "0", whether or not the 0.3 TM has been started is checked and if NO, the timer is started (block 155). While the CI port input sustains "0", a check is made as to whether or not the interval timed by the 0.3 TM timer has elapsed. While the CI port input sustains "0", the timer is not reset. When the 0.3-second timed interval has elapsed, block 156 is judged YES. Normally CI=0 does not last long before the 0.3 TM timer is reset. In the case of abnormality, the COv port on the other side (or the CO port for the vendor control section 11) sustains "0" so that "0" is continuously supplied to the CI port input (CIv port input) until block 156 is judged YES.

Block 157 examines whether or not the flag FD has been set to "1". Since initially FD=0, block 157 is judged NO so that the timer flag TMF is set to "1", the flags STOK and, MSCF are reset, and the ROU register is set to all 1s (indicating absence of signal), which is produced from the OU port. Then the MR memory is cleared, the RMSC register reset and the CO port is set to "0".

(6) Pace Keeping Processing

Pace keeping of both control sections 10 and 11 at the time the electric power source is turned on is carried out as follows:

The coinmech control section 10 effects the signal start processing 54 of FIGS. 8(*a*) and 8(*b*) (since STOK is initially "0"). Because the timer flag TMF is not yet set, block 158 or TMF=1 is judged NO so that "all 1" is set in the ROU register and the OU port produces all 1s or "1111" meaning absence of signal. Then whether or not the FD flag is "1" is examined (block 159) and if NO, the Ri register and the flag FA are successively reset and the CO port is set to "0". The vendor control section 11 likewise effects the signal start processing 59 shown in FIG. 13 whereby, passing through NO of block 160 "TMF=1", the OUv port output signal is set to "1111" and the COv port to "0".

In the C port check processing 55 shown in FIG. 9, the COv port output on the other side or the CI port input is checked and, upon detecting that CI=0 has lasted longer than 0.3 seconds, the processing for NO of block 157 is carried out. Then, as before, TMF is set to "1" and the CO port to "0". In the vender control section 11 also, a similar processing is effected in the C port check processing 66 in FIG. 14.

Figure 13:
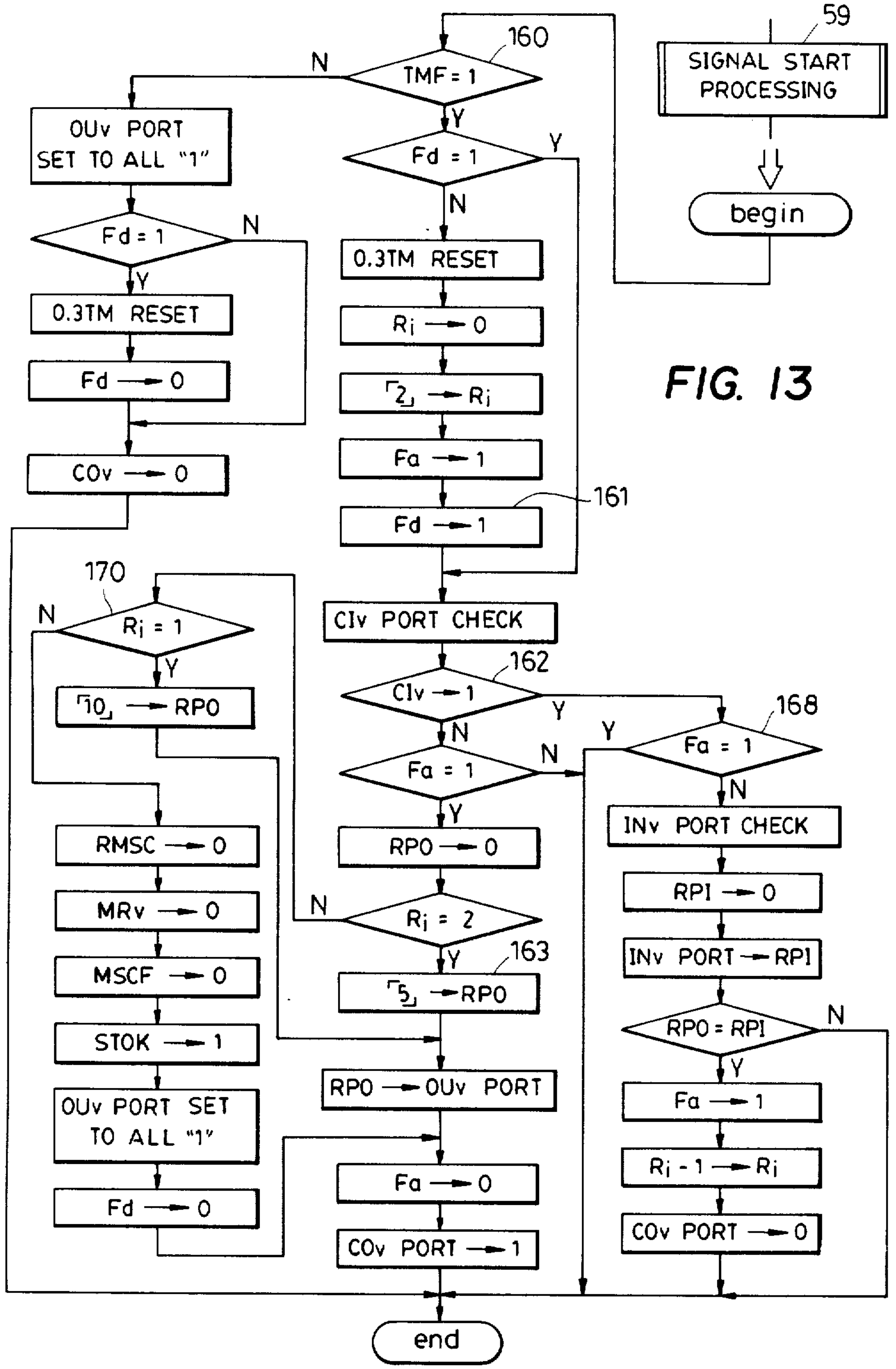
FIG. 13 is a flow chart showing in detail an example of a signal start processing in FIG. 10.
Figure 14:
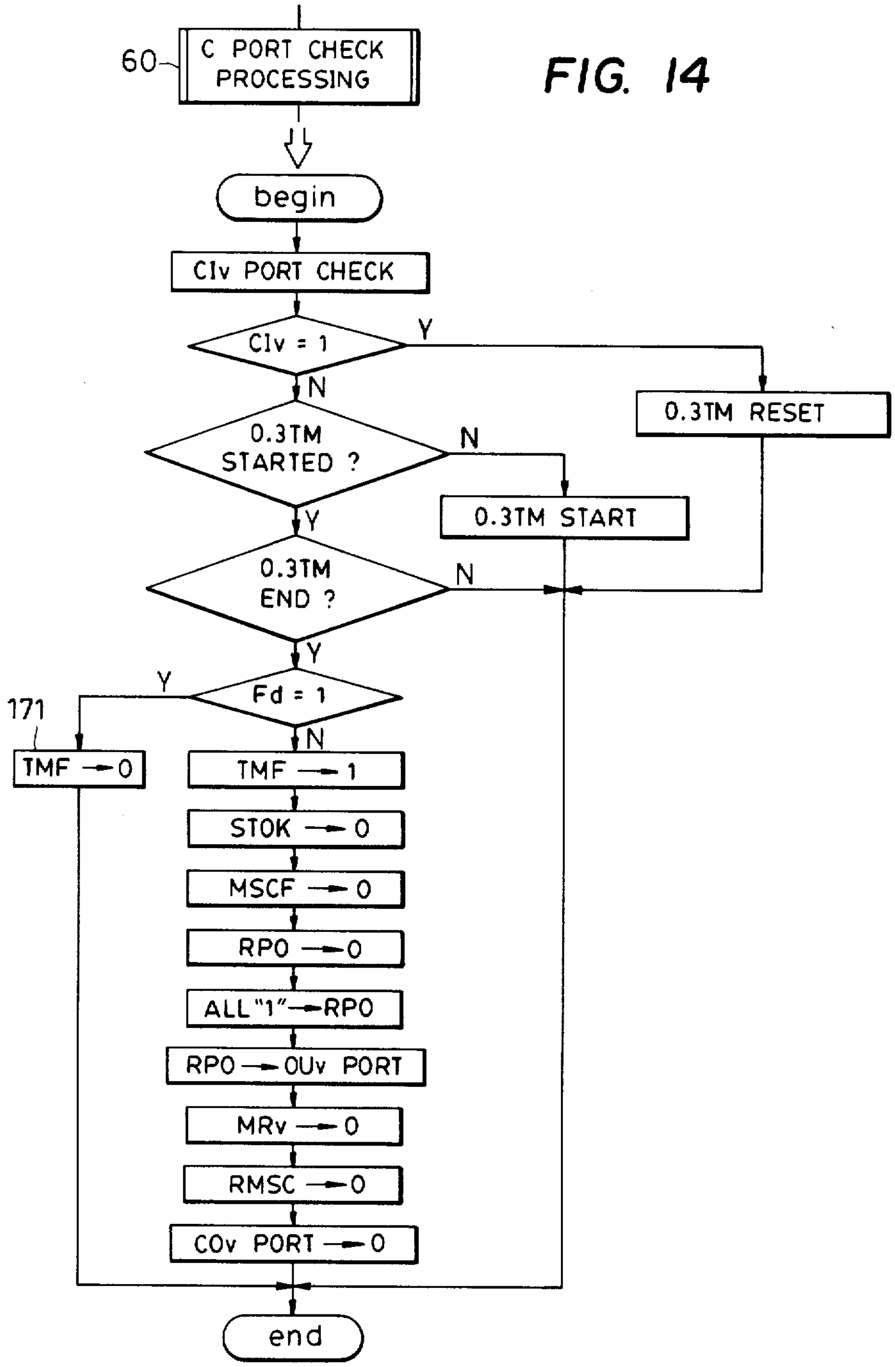
FIG. 14 is a flow chart showing in detail an example of a C port check processing in FIG. 10.
Figure 15:
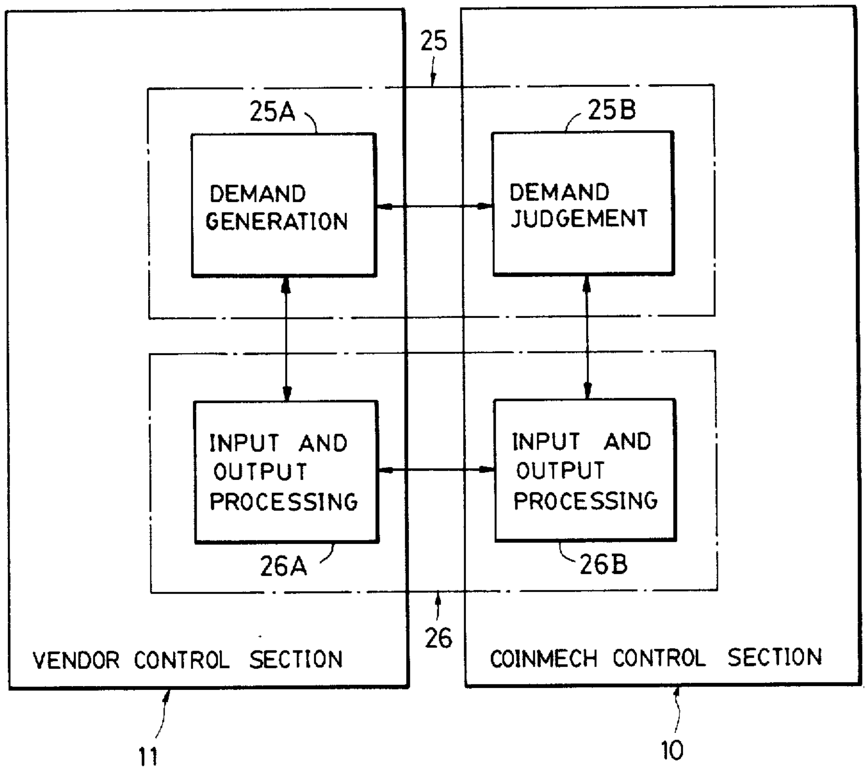
FIG. 15 is block diagram showing an outline of the present invention in a functional manner.

In the followihg processing shown in FIG. 13, block 160 or TMF=1 is judged YES. The Fd flag is still "0" so that the 0.3 TM timer is reset, the value 2 is set in the Ri register and the flags Fa, Fd are set to "1" (block 161).

The CIv port input is still "0" so that block 162 is judged NO. Upon confirming that the Fa flag is "1" and the contents of the Ri register are 2, the value 5 (code "0101") is set in the RPO register (block 163) and produced from the OUv port. Then the flag Fa is reset and the COv port output is set to "1". In the next cycle, whether or not CIv=1 is checked in block 162. If NO, Fa=1 is judged NO to come to the end of the processing. This is repeated until the CIv port goes to "1".

Referring to FIG. 8, TMF=1 and block 158 is judged YES. Since the flag FD is not yet set to "1", the 0.3 TM timer is reset, the value 2 is set in the Ri register and the flag FD is set to "1". Until the CI port goes to "1", NOs of blocks 164 and 165 are repeated and the CO port is kept "0". As before, when the COv port goes to "1", the CI port input goes to "1" and block 164 is judged YES. Upon confirming that the Ri register is not "0" in block 166, the value 5 supplied to the IN port is set in the RIN register (block 167), and then in the OU port so as to be returned to the vendor control section side. Then the FA flag and the CO port are successively set to "1".

In FIG. 13, "1" from the CO port causes block 162, CIv=1, to be judged YES and Fa=1 is examined (block 168). Since Fa was reset when the value 5 was delivered, block 168 is judged NO and the data returned to the INv port is set in the RPI register to compare RPO and RPI. If RPO=RPI is correct, the Fa flag is set to "1" and 1 is subtracted from the contents of the Ri register (presently "2") and the COv port is set to "0".

In FIG. 8, due to the signal "0" from the COv port (which indicates that the value 5 was properly sent and received), block 164, CI=1 is judged NO. Upon confirming Ri=2, whether or not the signal taken in the RIN register is 5 is checked. If YES, 1 is subtracted from the contents of the Ri register (presently 2) to obtain the contents "1" (block 169). Then the FA flag is reset and the CO port is set to "0". Delivery of the next signal is now demanded.

In FIG. 13, by "0" from the CO port, block 162, CIv=1, is judged NO and so, upon confirming that the contents of the Ri register are not "2" but "1" (YES of block 170), the value 10 (code "1010") is set in the RPO register and produced from the OUv port. Then the Fa flag is set to "0" and the COv port to "1".

In FIG. 8, the processing proceeds through YES of block 164 (CI=1), NO of block 166 and, as before, the value 10 supplied to the IN port is stored in RIN and ROU and returned from the OU port to the INv port. Then FA and the CO port are successively set to "1".

In FIG. 13, the processing proceeds through YES of block 162 (CIv=1), NO of block 168 and, as before, the produced data and the returned data are compared. If they coincide, Fa is set to "1" and 1 is subtracted from the contents of Ri (presently 1) to obtain the contents "0". The COv port is then set to "0".

In FIG. 13, the processing proceeds through NO of block 162 (CIv=0) to block 170 to confirm that the contents of Ri are neither "2" nor "1" but "0". Then RMSC, MRv, MSCF are reset. Further the STOK flag is set to "1" to complete the signal start processing 59. The OUv port output signal is set to all 1s, the flags Fd, Fa are reset to "0" and the COv port is set to "1".

In FIG. 8, by "1" of the COv port output, block 164 is judged YES. Block 166 is judged YES since the contents of the Ri register are "0", so that the 3-second timer 3STM is reset, RMSC is reset, and the OU port output signal is set to all 12 s. Then the STOK flag is set to "1" to indicate the end of the signal start processing 54. Thereafter the FD flag is reset to "0" and the CO port is set to "1".

Thus, the signal start processings 54 and 59 are completed in both control sections in synchronism. As a result, in the I/O port input and output, the 4-bit signal from OU to INv and the 4-bit signal from OUv to IN are set to all 1s respectively while the control signal from CO to CIv and the control signal from COv to CI are set to "1" respectively. These signals are thus set in a standby state. The program leaves the signal start processings 54 and 59 as the STOK flag is set to "1".

The pace keeping of both control sections 10, 11 at the detection of abnormality is carried out almost in the same manner as above.

When abnormality occurred on the coinmech control section side (e.g., NO of block 87 in FIG. 5, NOs of blocks 131, 149 in FIG. 7), the STOK flag is reset to "0" so that the signal start processing 54 in FIG. 8 may be executed. Therefore, passing through NO of block 158, the OU port output is set to all 1s and the CO port output is kept "0". Then the C port check processing 60 on the vendor control section side (FIG. 14) is effected to detect that the CIv port input sustained "0" longer than 0.3 seconds, set the TMF flag, reset the STOK flag and set the COv port to "0". In the next cycle, the signal start processing 59 in FIG. 13 is carried out wherein the step proceeds through YES of block 160, NO of Fd=1 to set the Fd flag to "1" in block 161. Thus in the C port check processing 60 (FIG. 14) in that cycle, Fd=1 is judged YES and the TMF flag is reset to "0" (block 171). In the next cycle, block 160 in FIG. 13 is judged NO so that the OUv port output is set to all 1s and the COv port is set to "0".

Thus the OU port output and the OUv port output are now both all 1s and the CO port output and the COv port output are both "0". Therefore, in the respective C port check processings, 54 and 59 abnormality of the CI port input and the CIv port input (i.e., being "0" longer than 0.3 seconds) are mutually detected and the respective TMF flags are set to "1". Based on this, the processings (signal start processings 54 and 59) are effected to send and receive the values 5 and 10 one after the other for comparison in the same manner as when the electric power source is turned on. Finally all the I/O port signals are set to "1" as before and set in the standby state.

The same processings as above are carried out where abnormality occurred on the vendor control section side (e.g., NOs of blocks 129 and 150 in FIG. 12). In this case, however, the coinmech control section 10 also generates "0" continuously from the CO port when the COv port of the vendor control section 11 has been continuously "0".

As mentioned above, the start processings are effected such that the I/O port signal is set in a standby state only when the proper sending and receiving of the values 5 and 10 was confirmed. This is useful for I/O port wiring short-circuiting detection as well as pace keeping of the I/O port signals of both control sections 10, 11. Specifically, because the value 5 is coded "0101" and 10 "1010", confirmation of proper sending and receiving of both codes of the values 5 and 10 means absence of short-circuiting in the wiring.

The invention may be applied to automatic machines for providing (vending) services such as games as well as to vending machines for vending articles. Therefore the goods herein include services as well as articles.

What is claimed is:

1. A control device in a vending machine and the like apparatus including a first control section for performing control functions relating to receiving and paying out of coins and a second control section for performing control functions relating to selection and vending of an article, said first and second control sections utilizing predetermined information generated by each other control section characterized in that the control device comprises:

first means in which said second control section exclusively generates a demand signal requiring that predetermined information be delivered from said first control section to said second control section or, concersely, that said first control section receive predetermined information from said second control section; and second means which, reponsive to said demand signal, brings one of said first and second control sections into a state in which it can deliver out the predetermined information and the other control section into a state in which it can receiving the information;

whereby sending and receiving of the information between said two control sections are performed under the supervision of said second control section in response to said generated demand signals from said second control section.

2. A control device as defined in claim 1 wherein said first means comprises demand generation means for generating a code in said second section representing said demand and demand interpretation means for interpreting the contents of said demand upon receipt of said code in said first control section; and said second means comprises first input and output processing means for bringing, in response to the demand generated by said demand generation means, said second control section into a state in which it can send or receive predetermined information and second input and output processing means for bringing, in reponse to the demand interpreted by said demand interpretation means, said first control section into a state in which it can send or receive predetermined information.

3. A control device as defined in claim 2 wherein a group of plural information is sent and received for a single demand.

4. A control device as defined in claim 3 wherein the group of plural information to be sent and received for a single demand is divided into units and sent and received respectively during a plurality of time intervals and each unit of said group of plural information is assigned a predetermined bit number.

5. A control device as defined in claim 4 wherein one of said first and second input and output processing means which has been brought into a state in which it can receive information sends back the signal of said receiving predetermined bit number to the other input and output processing means which has been brought into a state in which it can send information, and said other input and output processing means collates the returned signal with the sent signal and when coincidence of the two signals has been detected, sending and receiving of a next signal of the predetermined bit number is started.

6. A control device as defined in claim 1 wherein said first and second control sections respectively comprise memory means for storing information to be sent to the other control section and information received from the other control section, obtaining information to be sent to the other control section from said memory means through said second means in the signal sending state, and storing information received from the other control section through said second means in said memory means in the signal receiving state.

7. A method for sending and receiving information between control sections in a control device for a vending machine and the like apparatus including a first control section performing control functions relating to receiving and paying out of coins and a second control section performing control functions relating to selection and vending of an article and other special functions characterized in that the method comprises:

classifying mutiple kinds of information to be sent and received into a plurality of modes;

designating from said second control section one of said modes including necessary information to be sent and received by means of a mode selection code; and performing sending and receiving of all information included in said one mode from said first control section to said second control section or from said second control section to said first control section in accordance with said one mode designaged by the mode selection code.

8. An information sending and receiving method as defined in claim 7 wherein the respective modes belong either to a first mode in which information to be transmitted from said first control section to said second control section is classified, or to a second mode in which information to be transmitted from said second control section to said first control section is classified;

when a mode belonging to said first mode has been designated, all information included in said mode is divided into separate information units which are each sent successively from said first control section to said second control section; and when a mode belonging to said second mode has been designated, all information included in said mode is divided into separate information units, which are each sent successively from said second control section to said first control section.

9. An information sending and receiving method as defined in claim 8 wherein the capacity of information capable of being sent and received in the respective modes is fixed to a predetermined amount peculiar to the respective modes, the number of said units for said successive sending and receiving of information in the respective modes is predetermined in accordance with this fixed amount and quality and quantity of information to be actually sent and received in the respective modes can be expanded or modified as desired within the scope of said fixed amount peculiar to the respective modes.

10. An information sending and receiving method as defined in claim 9 wherein blank information representing absence of a signal is sent and received in locations where significant information to be sent and received is not allotted in the respective successive sending and receiving units consisting of the predetermined unit number, and when sending and receiving of information (including the blank information) in all of the successive sending and receiving units for one mode has been completed, special information representing the completion is sent and received.

* * * * *